United States Patent
Frank et al.

(10) Patent No.: US 7,610,631 B2
(45) Date of Patent: Oct. 27, 2009

(54) METHOD AND APPARATUS FOR PROVISIONING SOFTWARE

(76) Inventors: Alexander Frank, 16814 NE. 33rd St., Bellevue, WA (US) 98008; Curt Steeb, 16331 NE. 46th St., Redmond, WA (US) 98052; James Duffus, 1310 E. Union St., #501, Seattle, WA (US) 98122; Mark C. Light, 10020 216$^{th}$ Ave. NE., Redmond, WA (US) 98053; Martin Holladay, 6050 Illahee Rd., Bremerton, WA (US) 98311; Paul Sutton, 1808 Bellevue Ave., #503, Seattle, WA (US) 98122; Thomas Phillips, 13328 NE. 55th Pl., Bellevue, WA (US) 98005; Zeyong Xu, 1711 28th Ave., #103, Issaquah, WA (US) 98029; Zhangwei Xu, 18283 NE. 97th Way, #103, Redmond, WA (US) 98052

( * ) Notice: Subject to any disclaimer, the term of this patent is extended or adjusted under 35 U.S.C. 154(b) by 83 days.

(21) Appl. No.: 10/989,122

(22) Filed: Nov. 15, 2004

(65) Prior Publication Data

US 2006/0107335 A1 May 18, 2006

(51) Int. Cl.
*G06F 21/00* (2006.01)
(52) U.S. Cl. ...................................... 726/30
(58) Field of Classification Search ............... 726/5, 726/10; 379/15.03, 202.12
See application file for complete search history.

(56) References Cited

U.S. PATENT DOCUMENTS

| 5,768,382 | A | 6/1998 | Schneier et al. |
| 6,253,224 | B1 | 6/2001 | Brice, Jr. et al. |
| 6,463,534 | B1 * | 10/2002 | Geiger et al. ............ 713/168 |

(Continued)

FOREIGN PATENT DOCUMENTS

GB 2378780 2/2003

OTHER PUBLICATIONS

Qiao et al., "MiSer: an Optimal Low-Energy Transmission Strategy for IEEE 802.11a/h", Sep. 2003, pp. 161-175, obtained from ACM.*

(Continued)

*Primary Examiner*—Emmanuel L Moise
*Assistant Examiner*—Jeffrey D Popham
(74) *Attorney, Agent, or Firm*—Marshall, Gerstein & Borun LLP

(57) ABSTRACT

A dynamic software provisioning system allows provisioning software on a number of different computing devices based upon a desired business process. The dynamic software provisioning system allows a user to request usage of the operating system for a specific period of time, for a specific amount of usage, or in any other desired manner from an operating system provisioning service or from a third party. The provisioning service processes the request from the user or from the third party to provision the use of the operating system and in response to the request provisions use of the operating system for a specific device specified by the request. The dynamic software activation system also includes a local provisioning module located on the device using the operating system, wherein the local provisioning module activates and deactivates the operating system based on instructions received from the provisioning service.

9 Claims, 24 Drawing Sheets

U.S. PATENT DOCUMENTS

| | | | |
|---|---|---|---|
| 6,587,684 B1 * | 7/2003 | Hsu et al. | 455/419 |
| 6,763,458 B1 * | 7/2004 | Watanabe et al. | 713/100 |
| 6,816,809 B2 * | 11/2004 | Circenis | 702/178 |
| 6,920,567 B1 * | 7/2005 | Doherty et al. | 726/22 |
| 2002/0123964 A1 * | 9/2002 | Kramer et al. | 705/40 |
| 2003/0149671 A1 * | 8/2003 | Yamamoto et al. | 705/59 |
| 2004/0023636 A1 * | 2/2004 | Gurel | 455/405 |
| 2004/0039916 A1 * | 2/2004 | Aldis et al. | 713/177 |
| 2004/0054908 A1 | 3/2004 | Circenis et al. | |
| 2004/0064707 A1 * | 4/2004 | McCann et al. | 713/185 |
| 2004/0128251 A1 * | 7/2004 | Adam et al. | 705/59 |
| 2006/0106920 A1 | 5/2006 | Steeb et al. | |

OTHER PUBLICATIONS

International Search Report for PCT/US05/40950 mailed Nov. 30, 2006.

Written Opinion for PCT/US05/40950 mailed Nov. 30, 2006.

* cited by examiner

684

688

692

696

704

708

METHOD AND APPARATUS FOR PROVISIONING SOFTWARE

TECHNICAL FIELD

This patent relates generally to computers and more particularly to computer operating systems.

BACKGROUND

A large percentage of the world population cannot afford to own a computer and/or various software allowing an efficient use of the computer. There is a need to provide affordable access to computing to the populations of the developing countries. This is also true in light of the traditional structure of the software industry, where software licenses are generally sold on a perpetual license basis. As a result of not having enough resources to purchase perpetual licenses for the various software, people are also prohibited from using such software even on a short term basis for training purposes, etc. Moreover, even in the developed countries, when a computer user needs to use a particular software for a limited amount of time, the user is discouraged by the necessity to purchase a perpetual license for that particular software.

This is particularly true in the case of operating system for the computer. Using the computing power of technologically advanced computers and the resources available through the Internet, it is necessary that a sophisticated operating system is used to operate the computer and its communication with the Internet and other resources. However, as is the case with software, operating systems are also generally sold with perpetual licenses, and the cost of such perpetual licenses are usually quite prohibitive compared to the purchasing power of people in various third world countries.

Various business models have been tried to provide an alternative solution for allowing use of software without requiring the purchase of a perpetual license. For example, various companies provide software based on application service provider (ASP) model, where software that is resident on a server on a network such as the Internet can be accessed by a user by logging into that server. However, this method requires that the user be continuously connected to the server via the Internet. This is not a viable solution in various developing countries, where access to the Internet is unreliable and expensive. Alternatively, software providers often allow users to download software for a fixed amount of time, generally for a trial purpose, after which the user has to purchase a perpetual license for the software. However, the time period for using such trial software is usually fixed and the user does not have a choice to purchase a time period of his or her own choosing, or to renew the user of the trial software for additional fixed amount of time. As can be readily appreciated, there is a need to provide software services to users in a manner such that a user can purchase the services in a variety of different manners.

SUMMARY

A dynamic software provisioning system allows provisioning software on a number of different computing devices based upon a desired business process. The dynamic software provisioning system allows a user to request usage of the operating system for a specific period of time, for a specific amount of usage, or in any other desired manner from an operating system provisioning service or from a third party. The provisioning service processes the request from the user or from the third party to provision the use of the operating system and in response to the request provisions use of the operating system for a specific device specified by the request. The dynamic software activation system also includes a local provisioning module located on the device using the operating system, wherein the local provisioning module activates and deactivates the operating system based on instructions received from the provisioning service.

In an alternate implementation, the dynamic software provisioning system allows a user to purchase usage of a software by purchasing a prepaid card. Using the prepaid card, the user is able to download a provisioning packet which allows the user to use the software for the specified amount of time. In yet another implementation, the dynamic software system allows an underwriter to sell a computer with a software and a specified amount of time for using the software.

In a yet another alternate implementation, the dynamic software provisioning system allows a user to purchase usage of an operating system by purchasing a prepaid card. Using the prepaid card, the user is able to download a provisioning packet which allows the user to use the operating system for the specified amount of time. In yet another implementation, the dynamic software system allows an underwriter to sell a computer with the operating system and a specified amount of time for using the operating system.

In yet another implementation, he dynamic software provisioning system includes a computer-readable medium having computer-executable instructions for performing a method comprising receiving a registration request for registering a provisioned device, wherein the registration request includes a provisioned device hardware identification, generating a provisioned device certificate, receiving a packet generation request for generating a provisioned device packet, wherein the packet generation request includes a provisioned device initialization key, and generating the provisioned device packet, wherein the provisioned device packet includes information authorizing a first amount of usage of a service on the provisioned device.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

A Network

Figure 1:
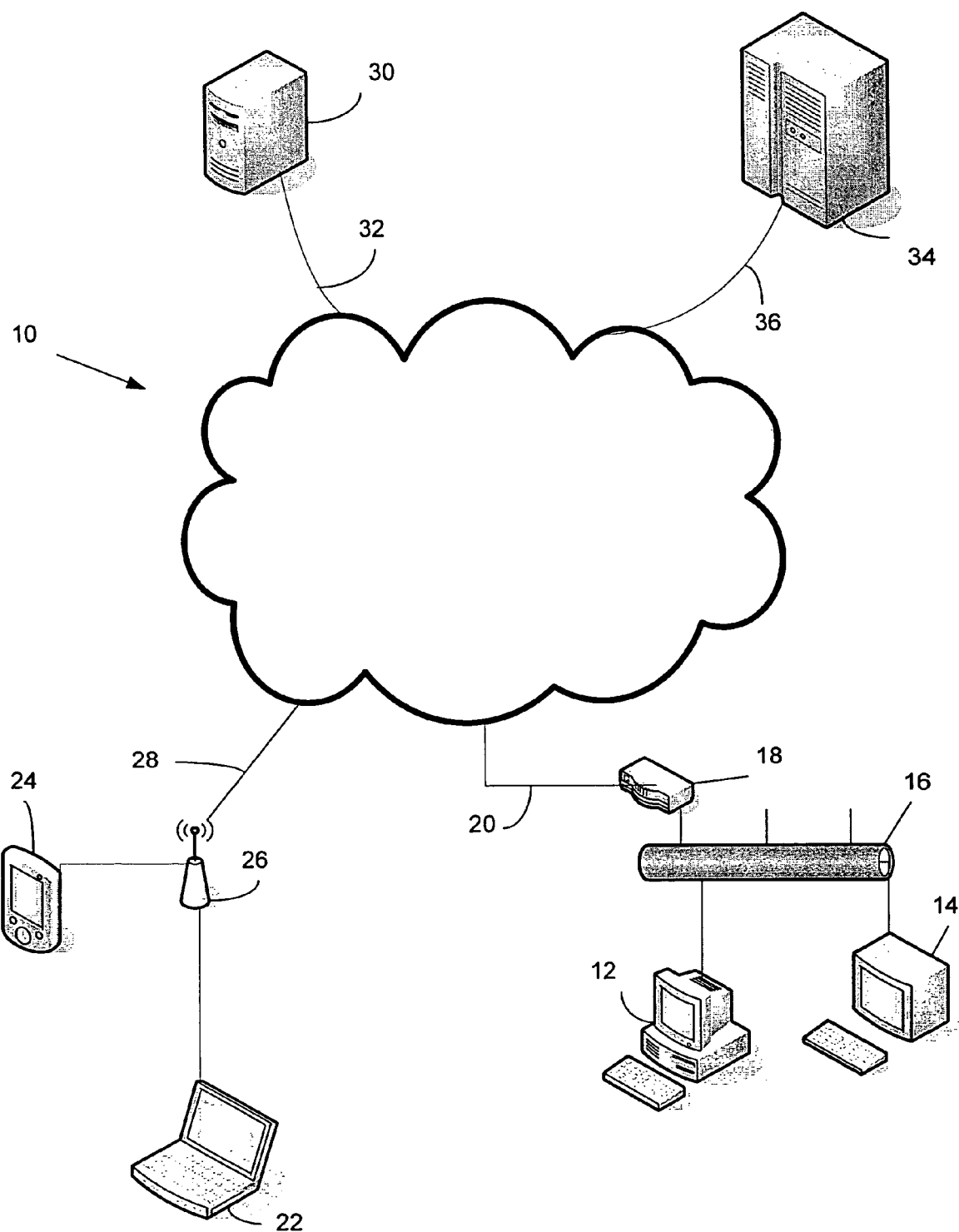
FIG. 1 is a block diagram of a network interconnecting a plurality of computing resources.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the dynamic software provisioning system may be stored and operated on any of the various devices connected to the network 10.

A Computer

Figure 2:
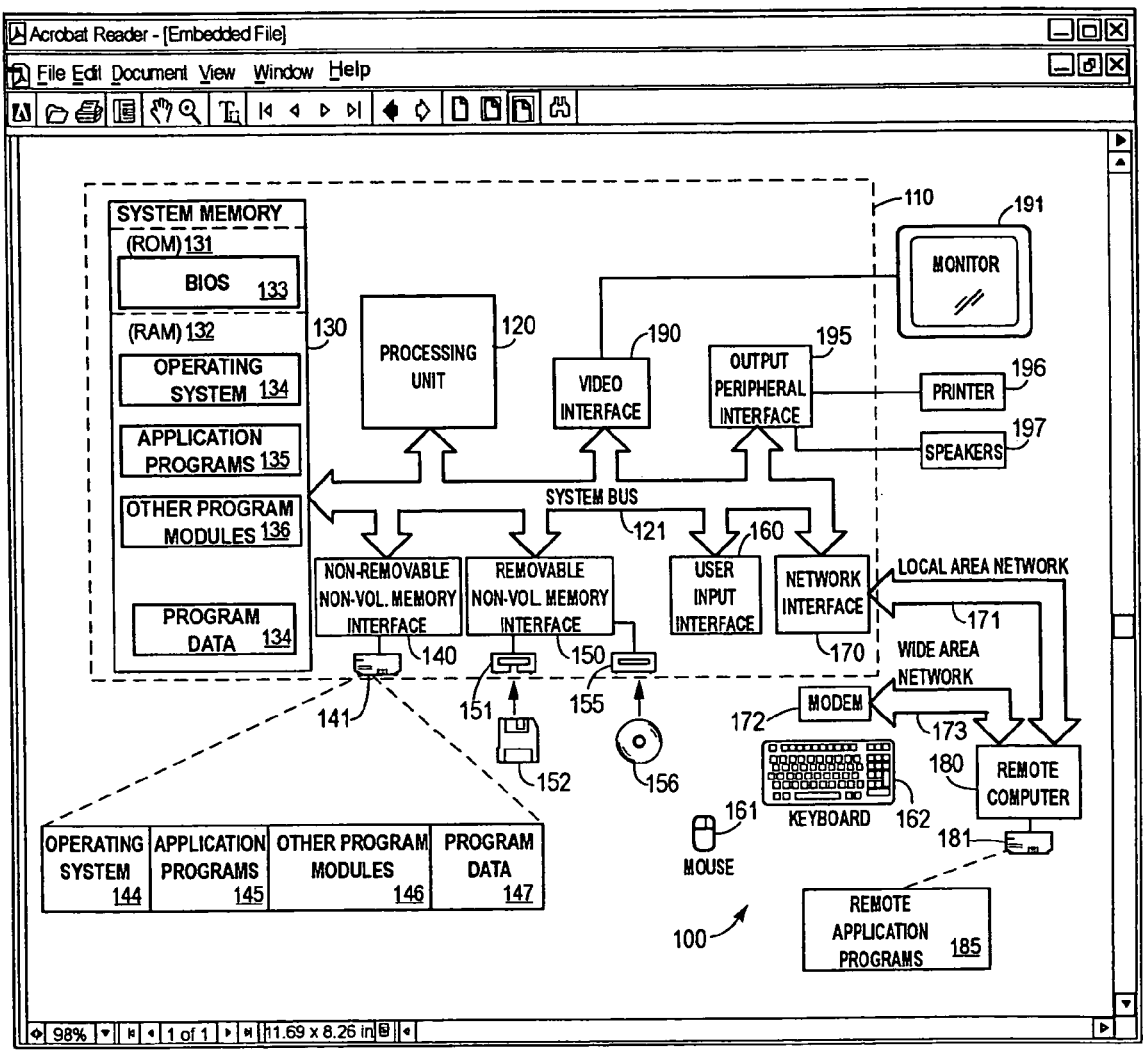
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Software Provisioning System

Figure 3:
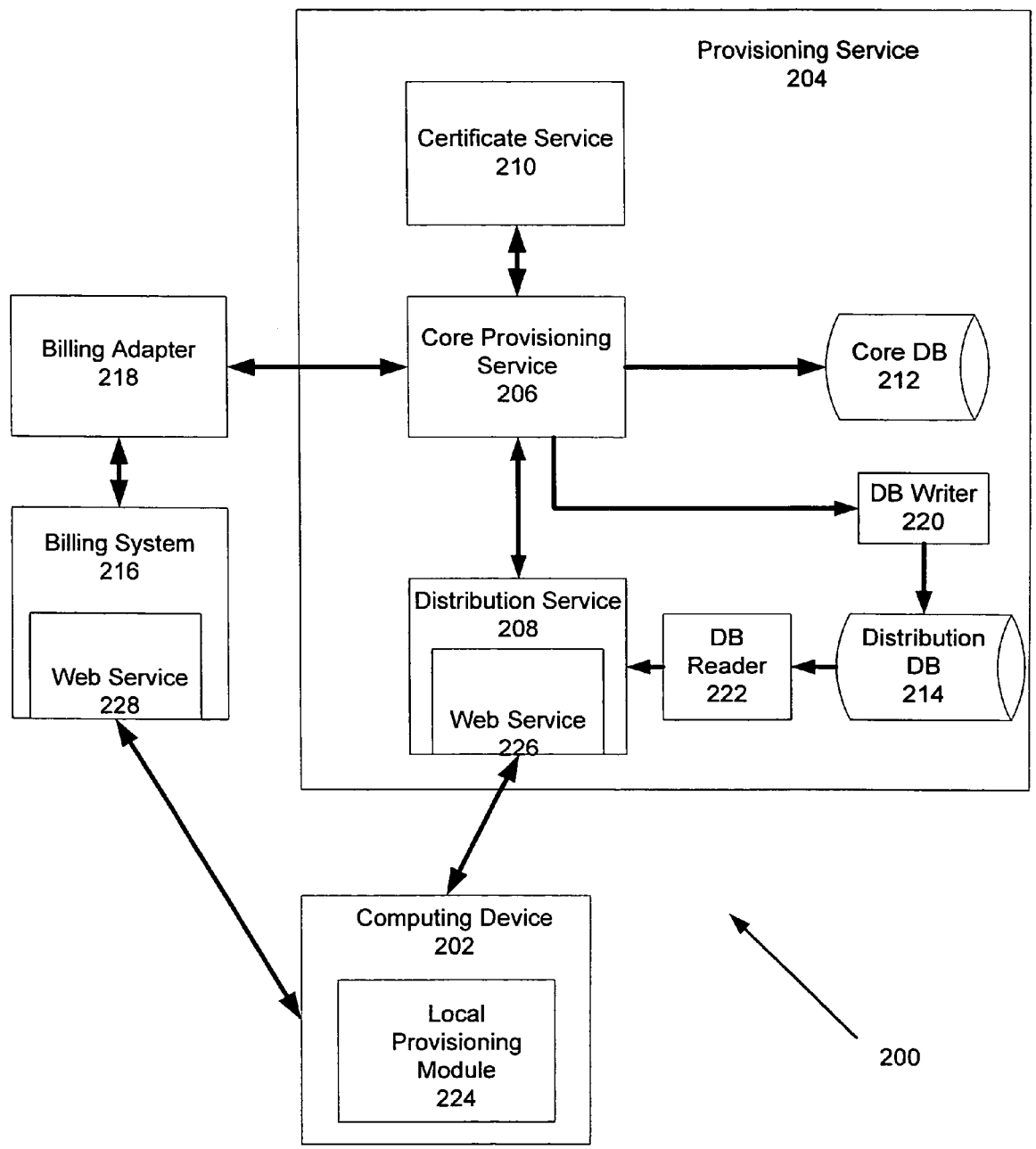
FIG. 3 is a block diagram of a software provisioning system for provisioning operating system on a computer on the network of FIG. 1.

FIG. 3 illustrates a dynamic software provisioning system 200 to provision usage of an operating system on a computing device 202, wherein the computing device 202 may be any of the commonly known computing devices, such as the desktop computer 12, the laptop computer 22, the PDA, 24, a cell phone, or any similar devices. While the software provisioning system 200 is shown to be implemented to provision usage of an operating system, in an alternate implementation, the software provisioning system 200 may be used to provision usage of other resources, such as software, a firmware, a feature of a computing device, etc. Similarly, while the software provisioning system 200 is shown to provision usage of a resource on the computing device 202 communicatively connected to the network 10, it may be used to implement such usage on a computing device that may not be connected to the network 10, or it may be temporarily connected to the network 10.

The software provisioning system 200 may include a provisioning service module 204, having a core provisioning service module 206, a distribution service module 208, a certificate service module 210, a core database 212, and a distribution database 214. The provisioning system 204 may communicate with a billing system 216 via a billing adapter 218, whereas the core provisioning service module 206 may communicate with the distribution database 214 via a database writer 220 and the distribution database 214 communicates with the distribution service 208 via a database reader 222. The computing device 202 may include a local provisioning module (LPM) 224 that communicates with the distribution service module 208 via a distribution web service module 226 and to the billing system 216 via a billing web service module 228.

The provisioning service module 204 may be located on a server system such as the server 30, or other system communicatively connected to the network 10. Similarly, the billing system 216 may also be located on server system such as the server 30, or other system communicatively connected to the network 10. Moreover, one or more of the various components of the provisioning service module 204 may be located on a same server or on a number of different servers located in different locations. For example, the core database 212 may be located on a number of different database servers located at different locations and each communicatively connected to the network 10. The functioning of the provisioning service module 204 and its various component modules is explained in further detail below.

While in FIG. 3, the computing device 202 is shown to communicate with the distribution service module 208 and the billing system 216 via web service modules 226 and 228, respectively, in an alternate embodiment, a user of the computing device 202 may communicate with the distribution service module 208 and the billing system 216 via alternate modes of communication, such as telephone, etc. For example, in a situation, where it is not possible for the computing device 202 to connect to the network 10, a user of the computing device 202 may communicate via a telephone and a voice-recognition enabled user interface attached to the distribution service module 208, or via a customer service representative able to communicate with the distribution service module 208, etc.

When the computing device 202 is a computer such as the computer 110, the LPM 224 may be located on the non-removable non-volatile memory 140, as part of the system memory 130, as part of various hardware components of the computer 110, including the processing unit 120, or as any combination of these. The functioning of the LPM 224 is explained in further detail below.

Provisioning System Flowchart

Figure 4:
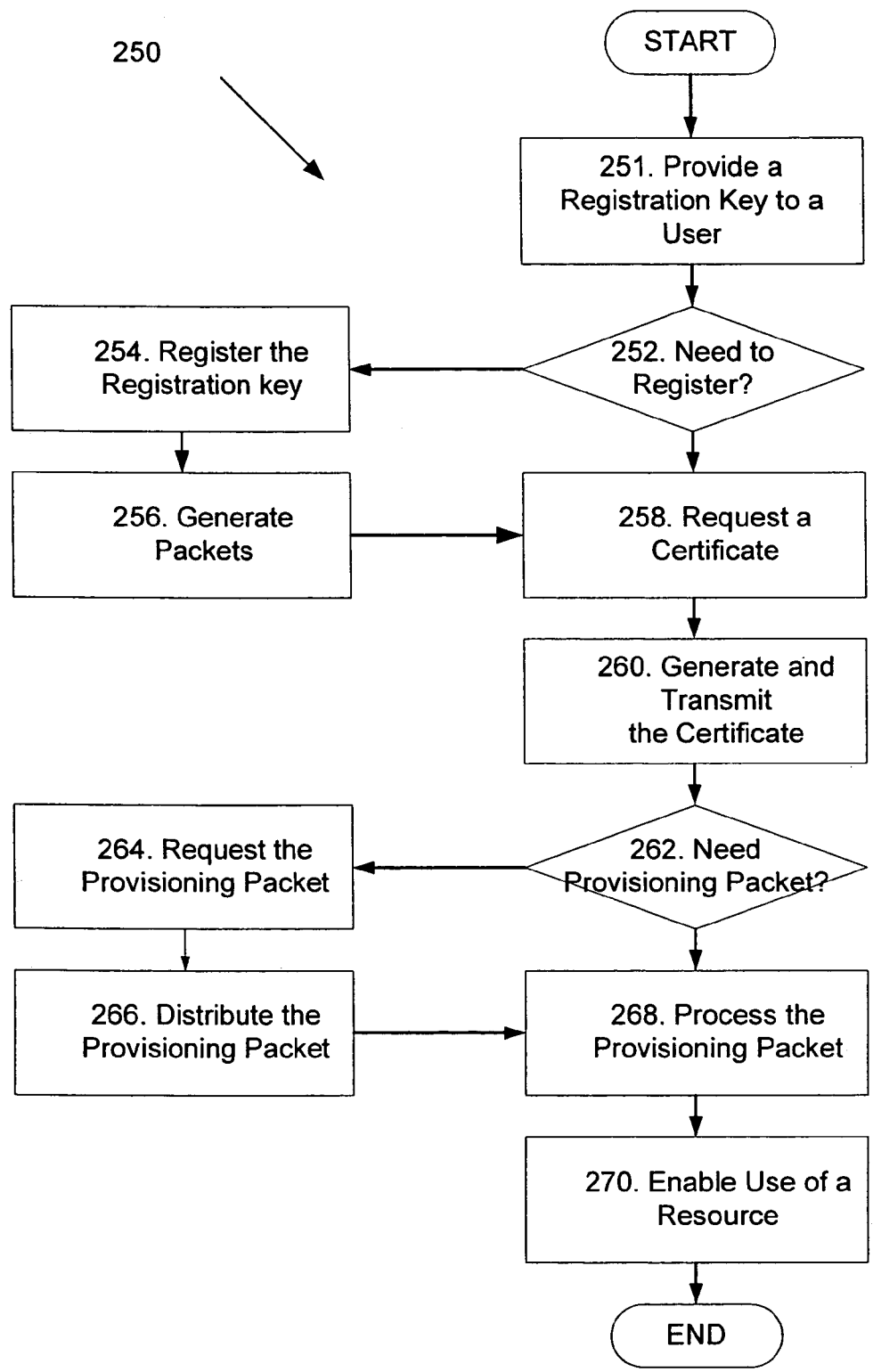
FIG. 4 is a flowchart describing registration of a computer on the software provisioning system of FIG. 3.

Now referring to FIG. 4, a provisioning program 250 illustrates general functioning of the software provisioning system 200. At a block 251 a user may be provided a registration key for using an operating system on the computing device 202. The user may be provided the registration key along with a new purchase of the computing device 202, as a result of the user purchasing additional time for use of the operating system, etc. A number of different entities may provide the registration key to the user, for example, a computer store selling the computing device 202 may provide the key to the user, an Internet service provider selling a bundle of services including usage of operating system for the computing device 202 may provide the registration key to the user, etc.

The registration key may be produced by the provisioning service module 204 using the certificate service 210, as explained below in further detail, and sent to the provider of the registration key in a secure manner. Alternatively, the provider of the registration key may produce the registration key in a manner as agreed upon with the provisioning service module 204. The registration key may or may not contain information specific to the hardware or other components identifying the computing device 202 using the registration key. In one implementation of the software provisioning system 200, each registration key uniquely identifies the computing device 202 by hardware identification (HWID) of the computing device 202. In yet another implementation, the registration key may be a production identification number, such as an operating system product key, etc., and may be produced by an entity other than the provisioning service, such as the developer of the operating system, the manufacturer of a computing device using the operating system, etc. The registration key, also referred to as the Initialization key (InitKey), may be in the form of a series of alpha-numeric characters, in the form of a radio frequency identification (RFID) tag, or in any other agreed upon format.

After providing the registration key to the user, at a block 252, the provisioning program 250 may determine if it is necessary to register the registration key with the provisioning service module 204. If the InitKey was initially developed by the provisioning service module 204, it may not be necessary to register the InitKey, as it may already be stored in a database at the provisioning service module 204. Alternatively, if the software provisioning system 200 is set up in a manner so that a third party vendor is allowed to generate an InitKey based on an agreed upon procedure, such vendor may need to register the InitKey upon its generation, or at least upon providing it to a user.

If it is determined that it is necessary to register the InitKey, at a block 254, the vendor may register the InitKey with the provisioning service module 204. The registration of an InitKey is illustrated in further detail in FIG. 9 below.

After registration of the InitKey, at a block 256, the provisioning program 250 generates a provisioning packet (also referred to as a "packet") for the computing device 202. A provisioning packet may be used by the computing device 202 to allow the user to use the operating system for a specified amount of time, for a specified period, or any other agreed upon manner. In an alternate implementation, the provisioning packet may be used to allow the user to use any other resource such as a software, an application, etc., for a specified period. The provisioning packet generated by the provisioning service module 204 may contain information about the user of that packet the amount of usage allowed by that packet, etc. For example, when a vendor sells the computing device 202 with one month of pre-paid usage of the operating system on the computing device 202, at the block 256, the provisioning service module 204 may generate a provisioning packet for the computing device 202 that allows the computing device 202 to use the operating system for one month period. However, the provisioning packet may be generated in a manner so that only the computing device 202 can use that particular provisioning packet. The generation of the provisioning packet is illustrated in further detail in FIG. 10 below.

When the user tries to activate the operating system on the computing device 202, by turning on the computing device 202, or in any other manner, the LPM 224 may control the activation of the operating system. This is denoted by a block 258 of the program 250. If the LPM 224 detects that this is the first time that the user is trying to use the operating system, the LPM 244 may request the user to input the InitKey. In an alternate implementation, the LPM 224 may scan the computing device 202 to determine if the computing device 202 is pre-populated with the InitKey, and if so the LPM 224 automatically retrieves the InitKey from the computing device 202. After receiving the Initkey from the user, the LPM 244 may connect with the provisioning service module 204 to request a certificate for the computing device 202, wherein the request for the certificate includes, among other information, the InitKey and the HWID of the computing device 202. The design and operation of the LPM 224 is described in further detail below in FIG. 7.

In response to the request for a certificate, at a block 260, the provisioning service module 204 may receive the certificate from the certificate service module 210 and transmits the certificate to the computing device 202 via the distribution service module 208. The process of generating a certificate from the certificate service module 210 and transmitting the certificate to the client device is described in further detail below in FIG. 10.

Upon receiving the certificate from the provisioning service module 204, at a block 262, the LPM 224 may determine if it is necessary to get additional provisioning packets for using the operating system on the computing device 202. The LPM 224 may consume the provisioning packets received from the provisioning service module 204 based on a business rule such as, the time for which the computing device 202 has been used, the current time period, or any similar business rule. As further described below, the LPM 224 may have a local provisioning packet storage module containing provisioning packet previously received from the provisioning service module 204. The LPM 224 may select a provisioning packet from such local packet store and analyses its content to determine if additional packets need to be requested from the provisioning service module 204. The selecting of a provisioning packet and analyzing the selected provisioning packet are explained in further detail below in FIG. 7 below.

If it is determined that it is necessary to request additional provisioning packets, at a block 264 the LPM 224 may send a request to the provisioning service module 204 to receive additional provisioning packets. The LPM 224 may send such a request to the PSM in a number of different manners, including by connecting to the web service module 226 of the distribution service module 208, requesting the user of the computing device 202 to contact a customer service representative at the provisioning service module 204, or any other desired manner. The request for provisioning packets may include information identifying the client device, the operating system used by the client device, etc.

Upon receiving the request from the computing device 202 for a provisional packet, at a block 266, the provisioning service module 204 may generate and distribute a provisioning packet to the LPM 224. Each provisioning packet provided to the LPM 224 may contain various information identifying the computing device 202, the operating system used by the computing device 202, the packet type, the packet sequence number, time for which the computing device 202 is allowed to use the operating system or the date on which the use of the operating system expires, etc. A digital signature that allows the LPM 224 to authenticate the information in the provisioning packet may also be included in the provisioning packet. Alternatively, under a different security protocol, the digital signature allowing the LPM 224 to authenticate the information in the provisioning packet may also be transmitted separately to the LPM 224. The generating and distributing of a provisioning packet is described in further detail in FIG. 12 below.

Upon receiving the provisioning packet, at a block 268, the LPM 224 may process the provisioning packet, which is described in further detail in FIG. 7 below. After analyzing the content of a provisioning packet, if the LPM 224 determines that it is allowed to enable use of the operating system on the computing device 202, at a block 270, the computing device 202 may turn on the operating system on the computing device 202.

Core Provisioning System

Figure 5:
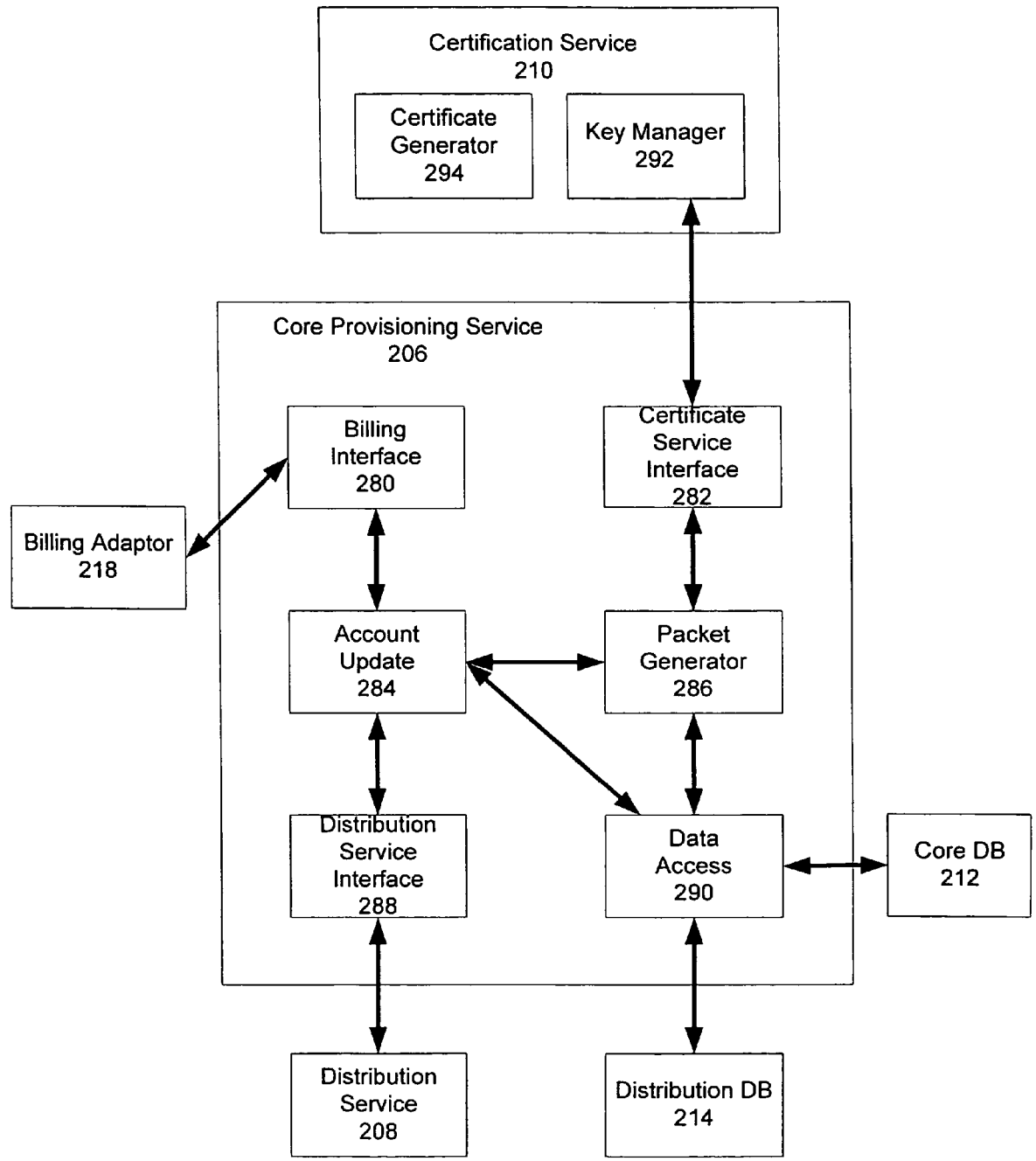
FIG. 5 is a block diagram of a core provisioning system of the software provisioning system of FIG. 3.

FIG. 5 illustrates a detailed block diagram of the core provisioning service module 206 of FIG. 3. The core provisioning service module 206 may be implemented on the server 30, the mainframe 34, or any other suitable device communicatively connected to the network 10. The core provisioning service module 206 may communicate with the certificate service module 210, the billing adaptor 218, the core DB 212, and the distribution service module 208. The core provisioning service 206 may include a billing interface 280 that communicates with the billing adaptor, a certificate service interface 282 to communicate with the certificate service module 210, a distribution service interface 288 to communicate with the distribution service module 208, an account update module 284, a packet generator 286, and a data access module 290 that communicates with the core database 21 and the distribution database 214.

The billing interface 280 may be implemented using a web interface, a VPN to the billing adaptor 218, or any other desired manner well known to one of skill in the art. In a particular implementation, the billing interface 280 may be implemented using a Microsoft message queue (MSMQ)™ interface. Alternatively, an interface designed using a different industry protocol, such as Microsoft Biztalk™ designed using the enterprise application interface (EAI) protocol may also be used to implement the billing interface 280. The MSMQ™ technology may also be used to implement the distribution service interface 288 and the data access module 290.

The billing interface module 280 may receive requests from the billing adaptor 218 for registration of InitKey for computing devices, communicates with the account update to provide account update information, bootstrapping various computing devices, requesting client certificates for the computing device from the certificate service module 210, etc.

The account update module 284 may be responsible for creating, maintaining and updating an account for the computing device 202. The account update module 284 may receive information from the billing adaptor 218 regarding setting up and updates for an account for the computing device 202 and it may communicate with the packet generator 286 to generate and store provisioning packets for the computing device 202. For example, an underwriter, such a telecom company may sell a block of usage time for the operating system on the computing device 202 and using the billing adaptor 218, send an account update request to the core provisioning service 206 for updating the account of the computing device 202 accordingly. Upon receiving the account update request from the billing adaptor 218, the account update module 284 may make necessary entries into the core database 212 using the data access module 290 and communicate with the packet generator to generate necessary provisioning packets. In an alternate case, the distribution service module 208 may receive a request from the computing device 202 to purchase a provisioning packet for the computing device 202.

On the other hand, when the computing device 202 sends a request to the core provisioning service 206 either for a certificate or for provisioning packets, the account update module 284 may retrieve a provisioning packet from the core database 212, update the account information for the computing device 202, and communicate with the distribution service module 208 to send the provisioning packet to the computing device 202.

When the core provisioning service 206 receives a request from the computing device 202 for a certificate or a provisioning packet, the core provisioning service 206 may communicate with the certificate service module 210 using the certificate service interface 282 to receive a certificate or to verify a certificate. The certificate service module 210 may be implemented using any of the standard certification technique that allows the generation and management of encrypted certificates. For example, the certificate service module 210 may be implemented using a certificate authority that complies with the public key infrastructure (PKI). The certificate service module 210 may include a key manager 292 which is responsible for generation of encrypted asymmetrical twin keys, identification and authentication of key subscribers, etc. The certificate service module 210 may also include a certificate generator for binding of a public key to a client account by means of a digital certificate, for issuance, maintenance, administration, revocation, suspension, reinstatement, and renewal of such certificates, and for creation and management of a public key repository. The generation and management of a certificate for a client are illustrated in further detail in FIG. 11 below.

The certificate service interface 282 may sign a provisioning packet generated by the packet generator 286 by using the certificate generated by the certificate service module 210 before it is sent to the computing device 202. The certificate service interface 282 may also communicate with the certificate service module 210 for verifying a client signature on packet requests, etc.

The core provisioning service 206 may be responsible for publishing a provisioning packet and other client device bootstrapping information, such as the client device certificate, into the distribution database 214. Note that the distribution service module 208 may be allowed to read information from the distribution database 214, however, to maintain the integrity of account information, the distribution service module 208 is generally not allowed to publish into the distribution database 214.

While the various modules in the core provisioning service 206 are shown as distinct modules performing the different tasks described above, it is understood that this delineation is for illustration purposes only, and that in practice, all of these different modules may be implemented in a different manner so that one or more of these modules are combined, all of these modules may interact with each other in a different manner, etc.

Core Database Schema

Figure 6:
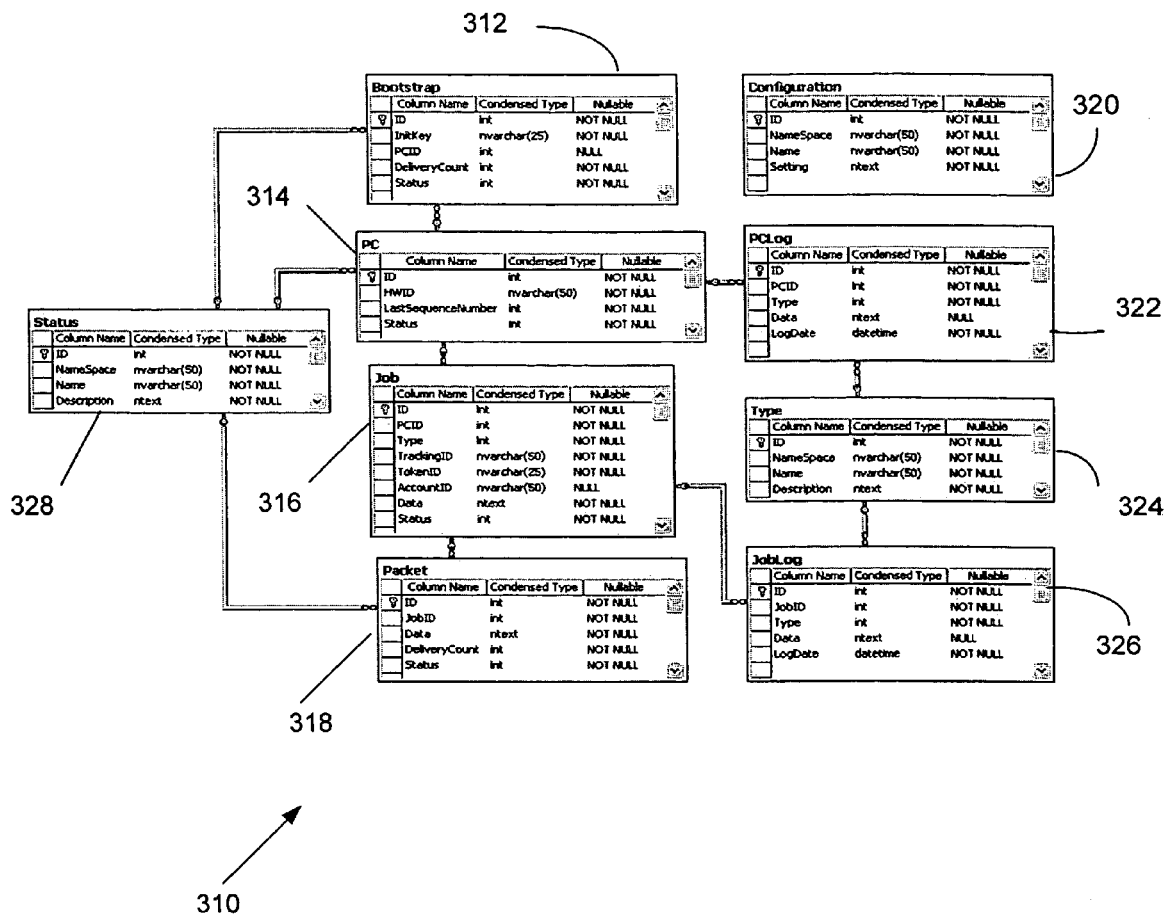
FIG. 6 is a block diagram of a core database used by the core provisioning system of FIG. 5.

FIG. 6 illustrates a core database schema 310 that may be used for an implementation of the core database 212. The core database schema 310 may include a bootstrap table 312, a computing device table 314, a job table 316, a packet table 318, a configuration table 320, a computing device log table 322, a type table 324, a job log table 326 and a status table 328. The core database schema 310 may be implemented using any of the well known relational database software and the various tables of the core database schema 310 may be stored on a single database server or on separate database servers connected to each other via a network such as the network 10.

The bootstrap table 312 may store bootstrap data for a computing device, such as the computing device 202, which may be provisioned using the software provisioning system 200, where such data is received from an underwriter via the billing adaptor 218. Each record in the bootstrap table 312 may include information including a record identification field, identification for a computing device, an InitKey provided to the user of the computing device, a delivery count identifying the number of times a packet has been delivered to a computing device and a bootstrap status of the computing device.

The computing device table 314 may store data related to a computing device, such as the computing device 202, which may be provisioned using the software provisioning system 200. The computing device table 314 may store various data related to the computing device that are added to a registration packet or a provisioning packet sent to the computing device. The computing device table 314 may be used to identify the computing device and track the status of the computing device. Each record in the computing device table 314 may include information including a record identification field, a hardware identification specifying the hardware configuration of the computing device, a last sequence number representing the sequence number of a previous provisioning packet sent to the computing device, etc.

The job table 316 stores data that may be created based on various provisioning requests to the provisioning service module 204, where each provisioning request creates a new record in the job table 316. The records in the job table 316 may be used to track the provisioning job status of the various provisioning requests. Each record in the job table 316 includes information including a record identification field, a computing device identification, a job type identification, a job tracking identification, a token for the provisioning request, an account identification for the computing device making the provisioning request, the date and time of the provisioning request, the status of processing the provisioning request, etc.

The packet table 318 stores packet data that may be created based on the job data, where one job may create one or more packets. The packet table is used to track the distribution status of various provisioning packets generated in response to provisioning requests received either from the distribution service module 208 or from the billing adaptor 218. Each record in the packet table may include information about the record identification, a job identification representing a job that causes the packet to be created, various data contained within the packet, a delivery count describing how many times a packet was delivered to a particular computing device since receiving the last packet download acknowledgement from that particular computing device, and a status denoting a stage of processing of the packet.

The configuration table 320 may store data representing all of name-value pairs of server configuration data, describing a server that is used to implement the core database 212. Each record in the configuration table 320 may include information about the namespace of the server, a name and a setting of a name-value pair of the server.

The computing device log table 322 may log various activities that are related to a computing device, other than a job related to that computing device. Each record in the computing device log table 322 may include information about the record identification, computing device identification, a type of the computing device, data describing the computing device, and the time when the computing device was logged in with the provisioning service module 204. For example, the type of computing device may be any one of, a bootstrap record created type, a bootstrap in progress type, a bootstrap completed type, a bootstrap over limit type (denoting that more than a specified number of certificates are delivered to the computing device without receiving an acknowledgement from the computing device), a certificate requested type, a packet requested type, etc.

The type table 324 may be used to predefine various enumerable types that are used by the job table 316, the computing device log table 322 and the job log table 326.

The job log table 326 may be used to log various activities that are related to a job or a packet, wherein each record may include information including a record identification, a job identification, a type of the job, a description of the job, a time when the job was logged, etc.

The status table 328 may be used to predefine various enumerable statuses that are used in the bootstrap table 312, the computing device table 314, the job table 316 and the packet table 318.

Distribution Database Schema

Figure 7:
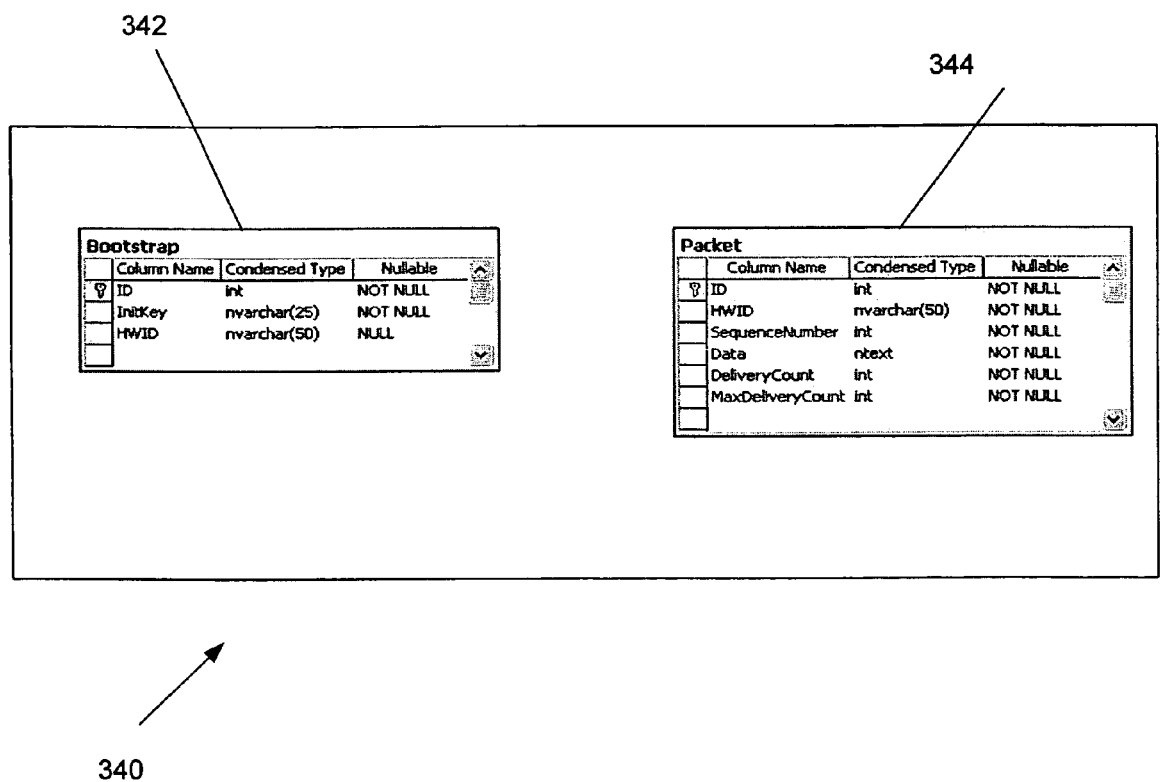
FIG. 7 is a block diagram of a distribution database used by the core software provisioning system of FIG. 3.

FIG. 7 illustrates a distribution database schema 340 that may be used for an implementation of the distribution database 214. The distribution database schema 340 may include a distribution bootstrap table 342 and a distribution packet table 344. The distribution database schema 340 may be implemented using any of the well known relational database software and the various tables of the distribution database schema 340 may be stored on a single database server or on separate database servers connected to each other via a network such as the network 10.

The distribution bootstrap table 342 may store bootstrap data that is published by the core provisioning service 206 during registration of a computing device. Each record of the distribution bootstrap table 342 may contain information including a record identification, an Initkey related to a particular computing device and a hardware identification of that particular computing device, and the records in the distribution bootstrap table 342 may be removed by the core provisioning service 206 when bootstrap for that particular computing is complete.

The distribution packet table 344 may store packets generated by the core provisioning service 206. Each record of the distribution packet table 344 may correspond to a particular packet and includes information including a record identification, a hardware identification describing a computing device that will be using that particular packet, the packet sequence number of that particular packet, content of that particular packet, a delivery count specifying the number of times that particular packet was transmitted to a client device without receiving an acknowledgement, and a maximum delivery counts specifying the number of times the distribution service module 208 may attempt to deliver that particular packet to a client device. When a particular packet is successfully downloaded by a client computing device, the record related to that particular packet may be removed from the distribution packet table 344. Also, if the delivery count for a particular packet is more than a maximum delivery count, the record related to that particular packet may also be removed from the distribution packet table 344.

Local Provisioning Module

Figure 8:
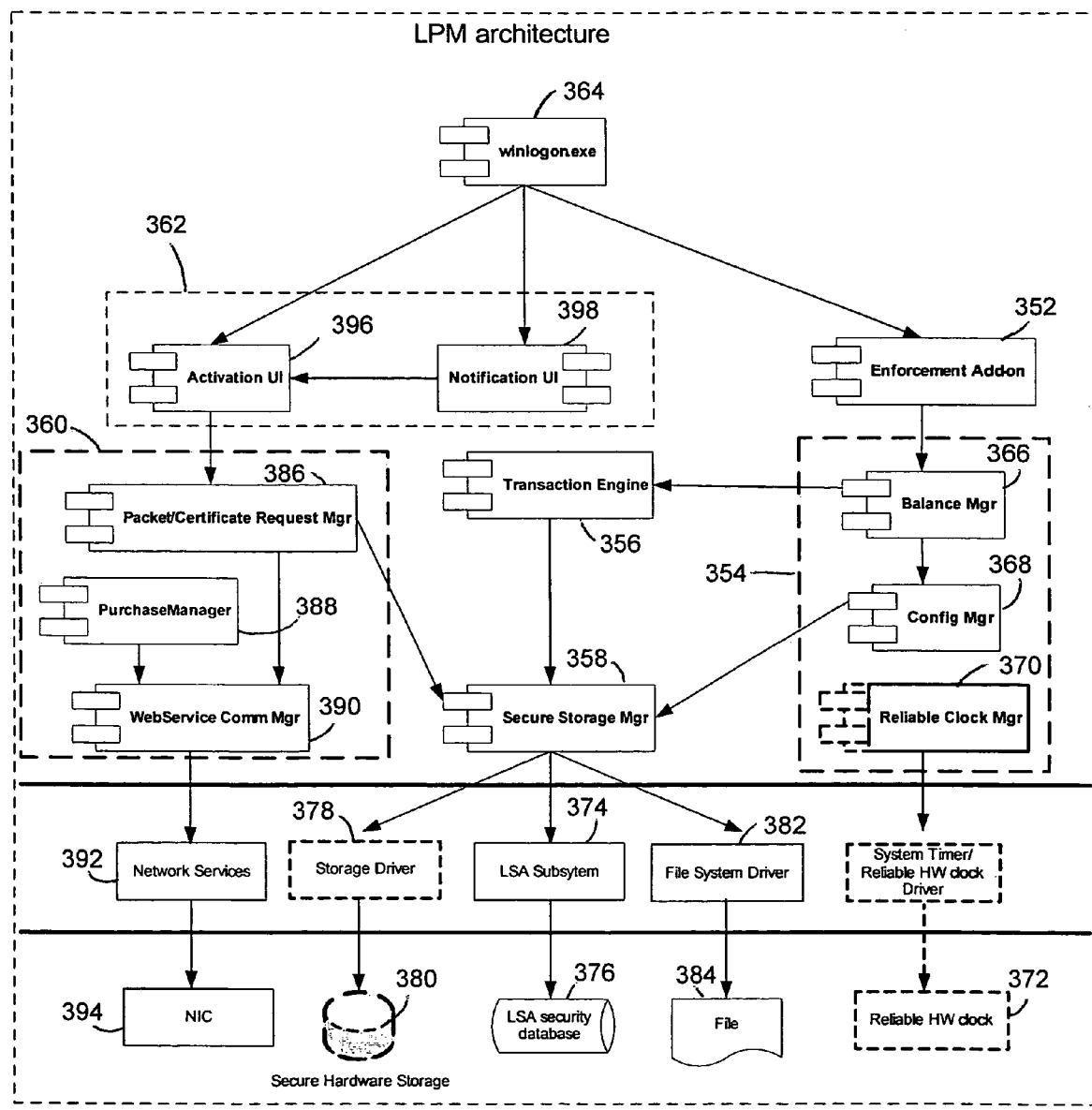
FIG. 8 is a block diagram of a local provisioning module of the software provisioning system of FIG. 3.

FIG. 8 illustrates a further detailed block diagram of the LPM 224. The LPM 224 is a client side component of the software provisioning system 200 residing on a computing device such as the computing device 202. The LPM 224 may perform various functions including interacting with users of the computing devices using a service provisioned by the software provisioning system 200, interacting with the distribution service module 208 via the network 10, etc.

The LPM 224 may perform the function of enforcing a particular state on the client computing device 202 by interacting with the particular login program used by the client computing device 202. In a particular implementation where the client device is using the Windows® product activation (WPA) system as the login logic, the LPM 224 may interact with the WPA to enforce the particular state on the client computing device 202. However, in an alternate implementation, the LPM 224 may interact with any other appropriate operating system login program. The implementation of the LPM 224 is described in the FIG. 8 as a grouping of various logical components implemented in software and composed as a library linked into a login program used by the WPA. However, in an alternate implementation of the LPM 224, one or more of the various logical components of the LPM 224 may be implemented in hardware. Specifically, the LPM 224 may include an enforcement add-on module 352 to enforce the computing device 202 to operate in a particular state, a metering module 354 to meter usage of a resource provisioned by the software provisioning system 200, a transaction engine 356 to transact using provisioning packets provided by the core provisioning service 206, a secure storage manager 358 to provide secure storage for the provisioning packets, a communication module 360 to communicate with the core provisioning service 206, and a user experience module 362 to interact with a user.

The enforcement add-on module 352 may be inserted into the login logic 364 of the computing device 202. When a user logs onto the computing device 202 using the login logic 364, the enforcement add-on module 352 within the login logic 364 may query the metering module 354 for balance information of the provisioning packets. If the enforcement add-on module 352 determines that the computing device 202 has enough provisioning packets, it may allow the login logic 364 to operate in its normal routine and allow the user to log onto the computing device 202. However, if the enforcement add-on module 352 determines that the computing device 202 does not have enough provisioning packets, it forces the computing device 202 to enter into a deactivated state. In such a deactivated state, limited user interface, which is just necessary to activate the computing device 202, is provided to the user of the computing device 202.

The metering module 354 may include a balance manager 366 for reading and verifying a current balance, available for usage of the provisioned resource, updating the current balance and for processing the provisioning packets. The metering module 354 may also include a configuration manager 368 and a reliable clock manager 370 for maintaining an always increasing timer. The reliable clock manager 370 may use a reliable hardware clock 372 to accomplish the task of maintaining the always increasing timer. The balance manager 366 and the reliable clock manager 370 are very sensitive and important to the secure operation of the LPM 224, and there for they are likely to be under various security attacks during the operation of the LPM 224.

The enforcement add-on module 352 and the metering module 354 may work together to implement activation and de-activation of the provisioned resource on the computing device 202. The enforcement add-on module 352 may function as an event dispatcher within the login logic 364 that evokes the balance manager 366 based upon certain events, while the balance manager 366 may determine what action to take when it is evokes in response to an event. Examples of various events that may cause the enforcement add-on module 352 to activate the balance manager 366 are (1) a logon event, (2) a system unlock event, (3) a restore from hibernation event, (4) a wake up from standby event, (5) a user triggered event, (6) a logoff event, (7) a packet download, (8) a timer tick, (10) a system lock event, (11) a screen saver starts event, (12) a screen saver stops events, etc. The balance manager 366 may accept the event as an input and return a result action to the enforcement add-on module 352.

For example, when a user is logging on, the enforcement add-on module 352 may send a user logon event to the balance manager 366. In response to the user logon event, the balance manager 366 may query the current balance available for using the provisioned resource, if the balance is sufficient, the balance manager 366 may return a log on action to the enforcement add-on module 352. However, if the balance is not sufficient, the enforcement add-on module 352 may cause the login logic 364 to return a notification user interface (UI) 398, wherein the notification UI allows the user to increase the balance and thus to activate the computing device 202 by purchasing additional provisioning packets from the provisioning service module 204.

The transaction engine 356 may process a provisioning packet in order to update a balance and a packet consumption counter in the balance manager 366. The transaction engine 356 may ensure that any provisioning packet is consumed only once to update the balance. The transaction engine 356 may be designed so that it updates the balance and the packet consumption counter together, thus either both of the balance and the packet consumption counter are updated or none of the balance and the packet consumption counter are updated. Alternatively, the transaction engine 356 may also be used to maintain the consistency of the balance data to ensure that the balance data is not corrupted by some unexpected event. An example of the functioning of the transaction engine 356 is provided below.

In this example, suppose that a user uses two prepay cards to purchase usage time for the provisioned resource, first card for ten hours and a second card for twenty hours. Because the provisioning service module 204 does not maintain total balance, two separate sets of license information are created at the provisioning service module 204, one for ten hours and one for twenty hours. When the user contacts the provisioning service module 204 to download the provisioning packets on the computing device 202, each of the provisioning packets downloaded on the computing device 202 have a unique provisioning packet number. When the transaction engine 356 processes the first packet, it increases the packet consumption counter and increases the balance by ten hours, subsequently, when the transaction engine 356 processes the second packet, it again increases the packet consumption counter and increases the balance by another twenty hours.

The secured storage manager 358 may allow the LPM 224 to store balance data in a secured manner so that it cannot be tampered with by a user and so that it is accessible only by the LPM 224. After a provisioning packet is downloaded by the LPM 224, it may be stored in the secured storage manager 358. Similarly, the balance counter and the packet consumption counter may also be stored in the secured storage manager 358. In the illustrated implementation, the secured storage manager 358 is implemented as a dynamic link library (dll) so that the user experience module 362 can access the secured storage manager 358.

To ensure that the data stored in the secured storage manager 358 is secure, a data encryption key may be used to store the data in the secured storage manager 358 and only a module having a data encryption key is able to read the data from the secured storage manager 358. The secured storage manager 358 may communicate with a local security authority (LSA) subsystem 374 to communicate with an LSA database 376, a storage driver 378 to communicate with secure hardware storage 380, and a file system driver 382 to communicate with a file 384 on the computing device 202. For added security, an alternate implementation of the secured storage manager 358 may also use multiple copies of the data stored in the secured storage manager 358 so that each copy can be cross-referenced to ensure that there is no tampering with any single copy of the data. While, the implementation of the LPM 224 discussed in here has the secured storage manager 358 implemented in software, in an alternate implementation, the secured storage manager 358 may be implemented in hardware.

The communication module 360 may include a packet/certificate request manager 386 to request provisioning packets and/or certificates from the provisioning service module 204, a purchase manager 388 to purchase additional provisioning packets from the billing system 216 and/or from the provisioning service module 204, and a web service communication manager 390 that allows the LPM 224 to communicate with the network 10.

The packet/certificate request manager 386 may receive a request from the user experience module 362 to request a packet or a certificate from the provisioning service module 204. For example, when the user is logging on the client device for the first time by inputting the InitKey into a UI, the user experience module 362 may pass on the InitKey to the packet/certificate request manager 386 and the packet/certificate request manager 386 may communicate with the provisioning service module 204 to receive a certificate from the provisioning service module 204. The packet/certificate request manager 386 may also be responsible to acknowledge to the provisioning service module 204 upon successful download of a certificate or a provisioning packet. The packet/certificate request manager 386 may use a provisioning protocol to communicate with the provisioning service module 204. A packet downloaded by the packet/certificate request manager 386 may be stored in the secured storage manager 358.

The purchase manager 388 may allow a user of the computing device 202 to purchase additional provisioning packets by receiving payment information from the user and communicating the payment information to the billing system 216 or to the provisioning service module 204. Both the packet/certificate request manager 386 and the purchase manager 388 may communicate with the network 10 using the web service communication manager 390. The web service communication manager may use a network services manager 392 and a network interface card (NIC) 394 to communicate with the network 10. Note that in the present implementation, the web service communication manager 390 is used to communicate with the network 10, in an alternate implementation, other communication tools, such as file transfer protocol (FTP) driver, etc., may be used to communicate with the network 10.

The user experience module 362 may include an activation user interface (UI) 396 to ask a user to enter the InitKey that allows the packet/certificate request manager 386 to download the certificate from the provisioning service module 204, and a notification UI 398 that allows the LPM 224 to interact with the user. For example, when a user has purchased a prepaid card for using a provisioned resource, the activation UI 396 may ask the user to enter the number provided by the prepaid card and invoke the packet/certificate request manager 386 to download the latest provisioning packets corresponding to the prepaid card number. The activation UI 396 may also invoke the purchase manager 388 to allow a user to purchase additional provisioning packets and it may be designed so that upon completion of the purchase it may automatically invoke the packet/certificate request manager 386 to download provisioning packets corresponding to the purchase.

The notification UI 398 may include various user interfaces that allow the user to query current balance information, usage history, etc. The notification UI 398 may be invoked by the user or by the login logic 364. In a situation where the balance available for using a provisioned resource is low, the login logic 364 may invoke the notification UI 398 to inform the user that additional purchase is necessary. The notification UI may be constantly active and it may provide notification service to the user via a taskbar icon, a control panel applet, a balloon pop-up, or by using any other commonly known UI method.

Having described the various components of the software provisioning system 200, the following FIGS. 9-12 describe the operation of the software provisioning system 200 in further detail.

Registration of InitKey

Figure 9:
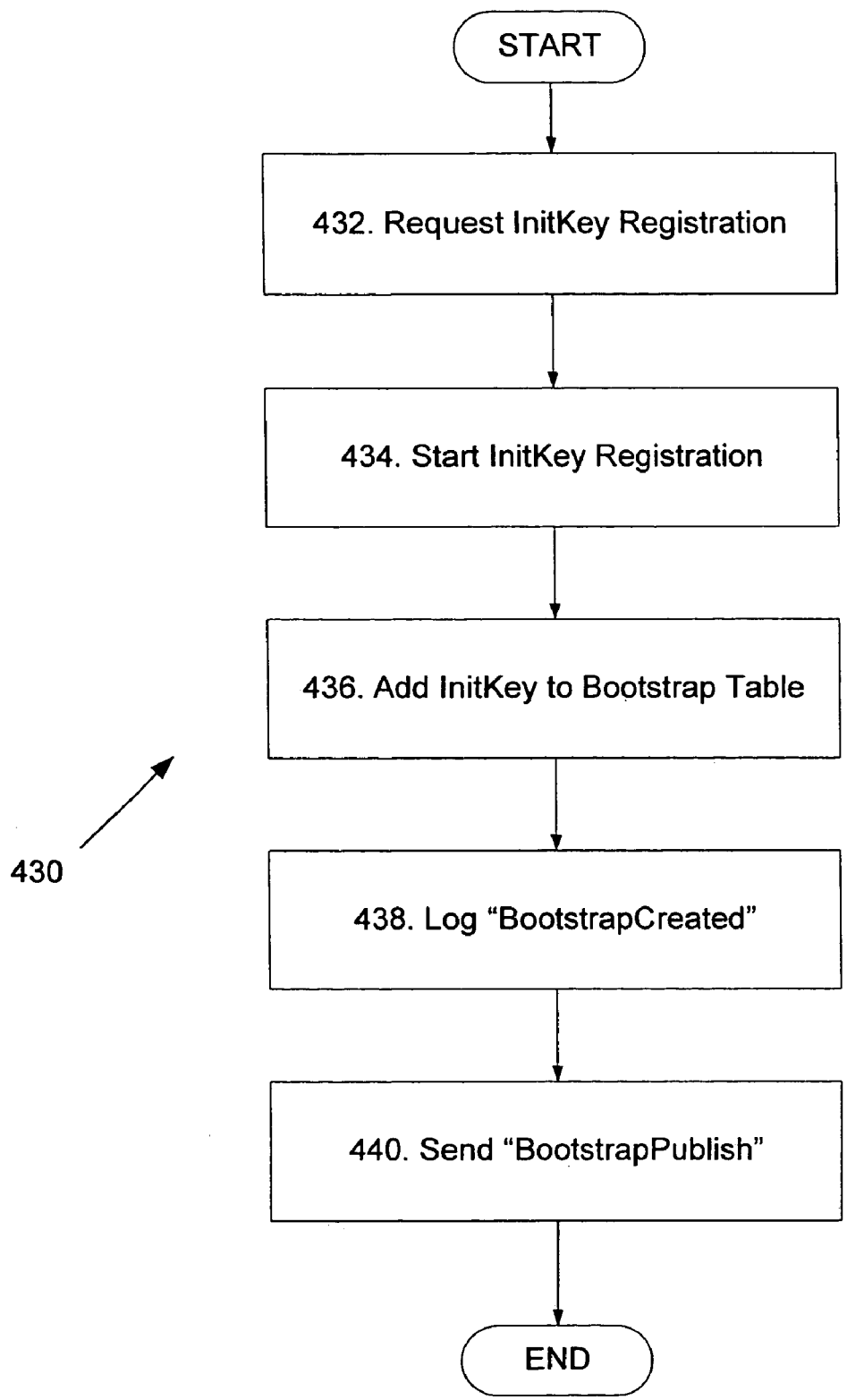
FIG. 9 is a flowchart of a key registration program used by the software provisioning system of FIG. 3.

FIG. 9 illustrates a flowchart of a registration program 430 that may be used for registering an InitKey with the core provisioning service 206. At a block 432, the provider of the InitKey sends an Initkey registration request to the core provisioning service 206. As discussed before, the provider may be the billing system 216, which may be managed by a third party, such as a vendor of the computing device 202, vendor of usage for the operating system of the computing device 202, a customer service representative (CSR) of the software provisioning system 200, etc.

The Initkey registration request may be received in a message queue of the core provisioning service 206. Upon recognition of an Initkey registration request in its message queue, at a block 434, the core provisioning service 206 may start the registration process.

At a block 436, the InitKey may be added to the Bootstrap table 312 of the core database 212 and the registration program 430 may set the bootstrap status to "Created."

Subsequently, at a block 438, the core provisioning service 206 may log a "Bootstrap Created" message in the computing device log table 322.

Finally, at a block 440, the core provisioning service 206 may send a "Bootstrap Publish" message to the message queue of the Distribution database 214.

Generation of Packets

Figure 10:
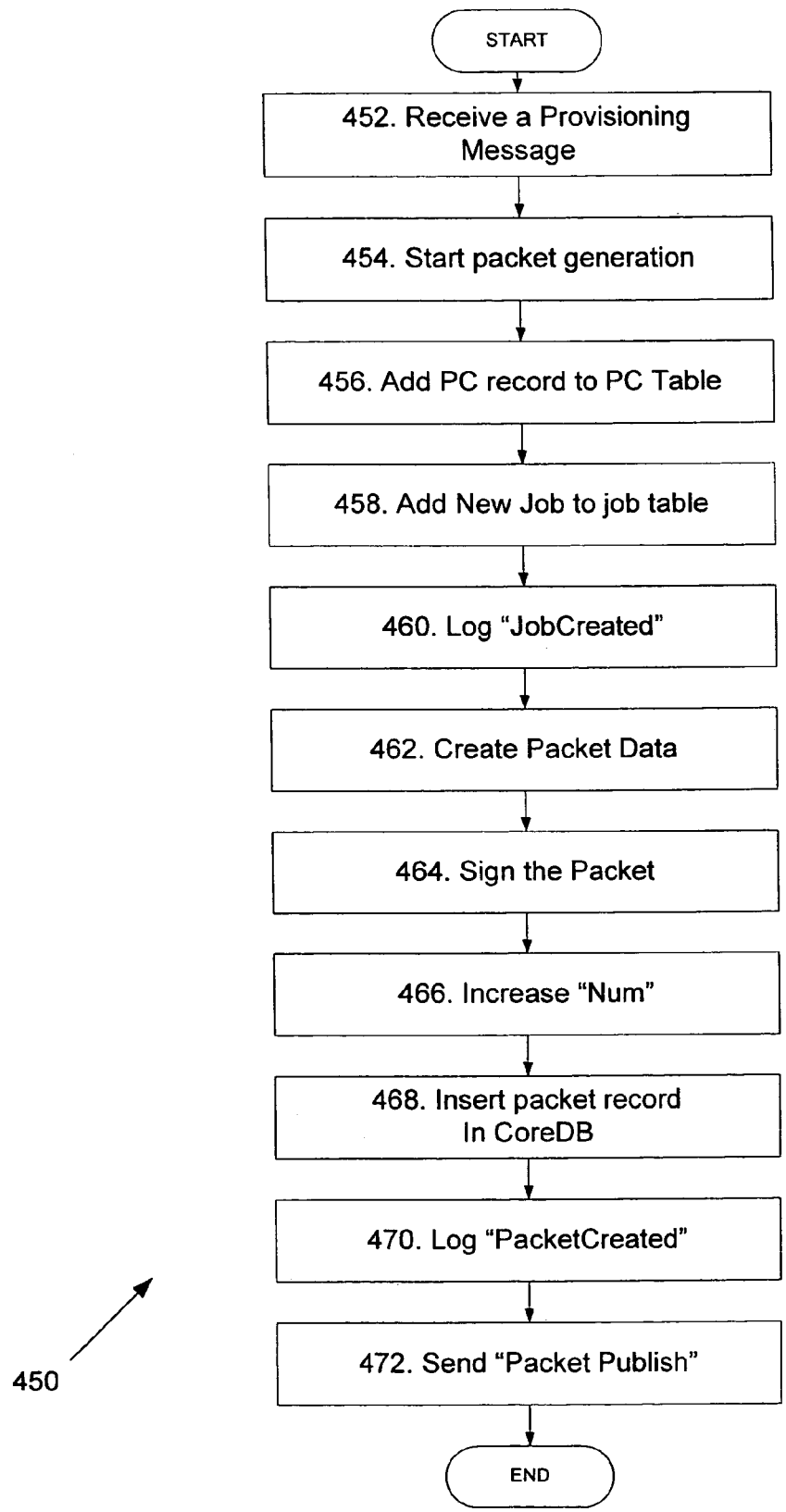
FIG. 10 is a flowchart of a packet generation program used by the software provisioning system of FIG. 3.

FIG. 10 illustrates a flowchart of a packet generation program 450 that may be used for generating provisioning packets to be used by the LPM 224 of the computing device 202.

At a block 452, the billing adaptor 218 may send a provisioning request message to the core provisioning service 206 for provisioning packets. As the core provisioning service 206 may be connected to a number of underwriters, such a provisioning request message is queued in the MSMQ interface connecting the billing adaptor 218 to the core provisioning service 206.

Upon retrieving a provisioning request message from the billing adaptor 218, at a block 454, the core provisioning service 206 may start a packet generation transaction.

At a block 456, the core provisioning service 206 may add a new computing device record to the computing device table 314 using a hardware identification from the provisioning request message. However, if a record containing the hardware identification is already present in the computing device table 314, it may not be necessary to add a new computing device record.

Subsequently, at a block 458, the core provisioning service 206 may add a new job record to the job table 316 recording a new job request for provisioning packet. The core provisioning service 206 may set the status of the newly added job record to "Created." At a block 460, the core provisioning service 206 may add new record in the job log table 326, with the date and time of the provisioning request message.

At a block 462, the core provisioning service 206 may create a provisioning packet based on the provisioning request message. The packet generation may include verifying the certificate provided in the provisioning request message, adding the amount of usage time to the provisioning packet, etc.

At a block 464, the core provisioning service 206 may communicate with the key manager 292 to sign the provisioning packet with a secure key and create an XML based provisioning packet.

Upon creation of the provisioning packet, at a block 466, the core provisioning service 206 may increase the last sequence number in the computing device table 314 by one.

At a block 468, the core provisioning service 206 may insert the newly created provisioning packet into the packet table 318 and set the status of the provisioning packet in the packet table 318 to "packet created."

Subsequently, at a block 370, the core provisioning service 206 may log a "packet created" message into the job log table 326. And finally, at a block 372, the core provisioning service 206 may send a "packet publish" message into the message queue to the distribution database writer 220 to add the packet into the distribution database 214.

Bootstrapping

Figure 11:
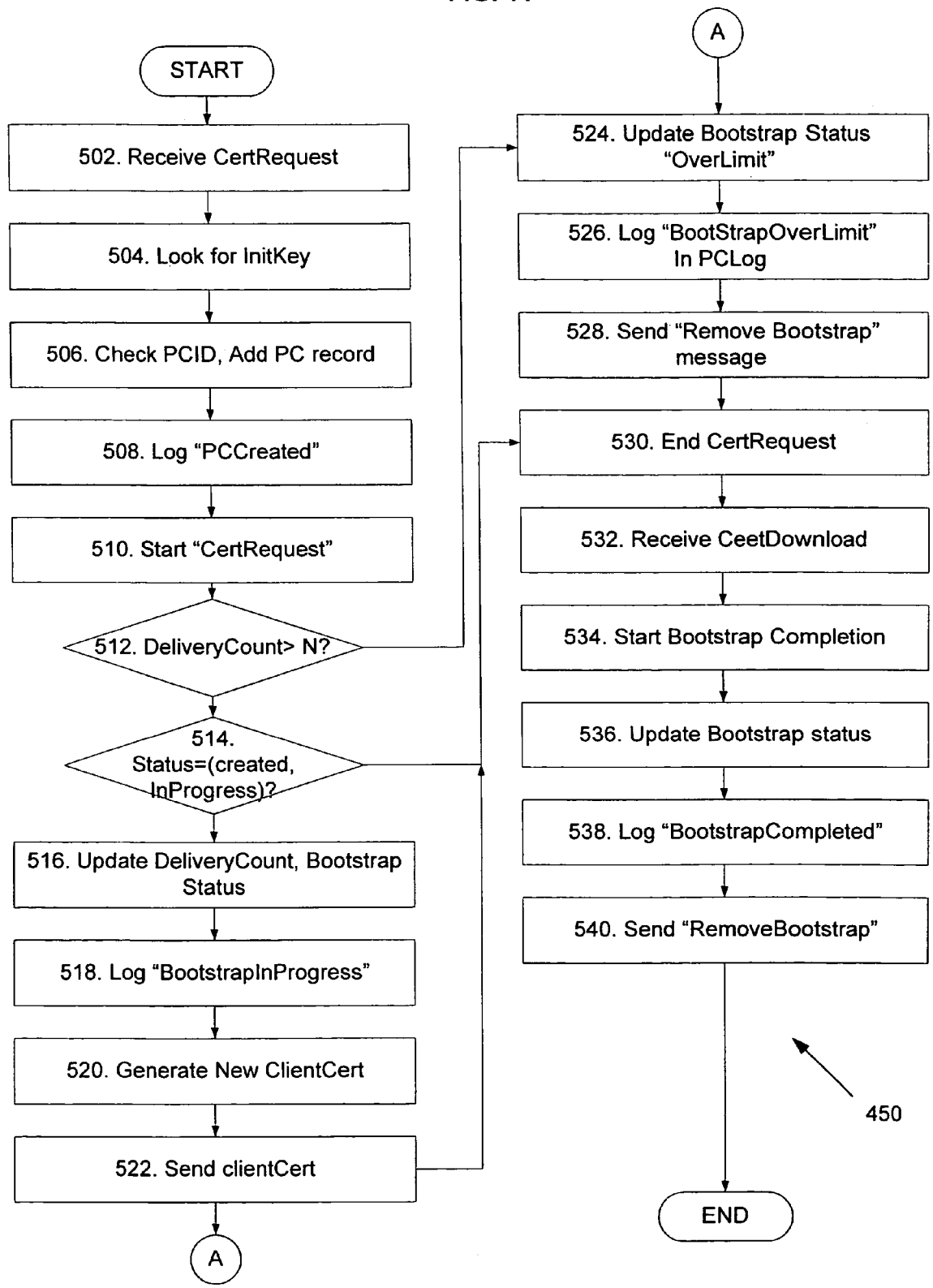
FIG. 11 is a flowchart of a bootstrapping program used by the software provisioning system of FIG. 3.

FIG. 11 illustrates a flowchart of a bootstrapping program 500 that may be used for requesting a certificate from the certificate service module 210 and transmitting the certificate to the computing device 202.

At a block 502 the distribution service module 208 may receive a certificate request from a computing device, such as the computing device 202. The certificate request may be generated by the packet/certificate request manager 386 and include information including the hardware identification for the computing device 202, the InitKey, etc.

At a block 504 the core provisioning service 206 may look for the InitKey in the bootstrap table 312. At a block 506 the core provisioning service 206 may check the computing device table 314 to see if it contains a record for the hardware identification provided in the certificate request. If no record exists in the computing device table 314, the core provisioning service 206 may add a record into the computing device table 314.

At a block 508 the core provisioning service 206 may log a "computing device created" message into the computing device log table 322. Subsequently, at a block 510, the core provisioning service 206 may start processing the certificate request transaction.

At a block 512, the core provisioning service 206 may check the bootstrap table 312 to see if the delivery count is bigger than a maximum delivery count specified by the configuration table 320, and if that is the case, it may transfer control to a block 524.

If the delivery count is not bigger than the maximum delivery count, at a block 514 the core provisioning service 206 may check the bootstrap status in the bootstrap table 312. If the bootstrap status is not equal to "created" or "In Progress," the control may transfer to a block 524.

However, if the bootstrap status is equal to either of "created" or "In Progress," at a block 516 the core provisioning service 206 may update the bootstrap status in the bootstrap table 312 to "In Progress."

Subsequently, at a block 518 the core provisioning service 206 may log "bootstrap in progress" message into the computing device log table 322.

At a block 520 the core provisioning service 206 may call a certificate utility to generate a new client certificate. After receiving the new certificate from the certificate utility at a block 522 the core provisioning service 206 may send the client certificate in the message queue of the distribution service module 208 and may transfer control to a block 530.

At the block 524 the core provisioning service 206 may update the bootstrap status in the bootstrap table 312 to "over limit" due to the delivery count in the bootstrap table being higher than the maximum delivery count. The "over limit" status signifies that the core provisioning service 206 has not received adequate acknowledgement from the LPM 224 in response to having published a certificate for the computing device 202. Therefore, at a block 526 the core provisioning service 206 may log a "bootstrap over limit" message into the computing device log table 322, denoting that no acknowledgements have been received from the computing device requesting the certificate.

At a block 528, the core provisioning service 206 may send a "remove bootstrap" message into the message queue of the distribution database writer 220 to remove a bootstrap record from the distribution database 214.

The block 530 may receive control from the block 522 after sending the certificate to the client, and therefore denotes end of the processing of the certificate request.

After processing the certificate request, at a block 532, the core provisioning service 206 may receive a certificate download completion message in the message queue of the distribution service module 208. Such a certificate download completion message may be transmitted by the packet/certificate request manager 386 of the LPM 224 after a successful download of a certificate.

Upon receiving the certificate download completion message, at a block 534 the core provisioning service 206 may start a bootstrap completed transaction. At a block 536 the core provisioning service 206 may update the bootstrap status in the bootstrap table 312 to "completed." Subsequently, at a block 538 the core provisioning service 206 may log a "bootstrap completed" message into the computing device log table 322 denoting that the bootstrap process for the computing device sending the certificate request is complete.

Finally, at a block 540 the core provisioning service 206 may send a "remover bootstrap" message into the message queue to the distribution database writer 220 to remove the bootstrap record from the bootstrap table 342 of the distribution database 214.

Packet Distribution

Figure 12:
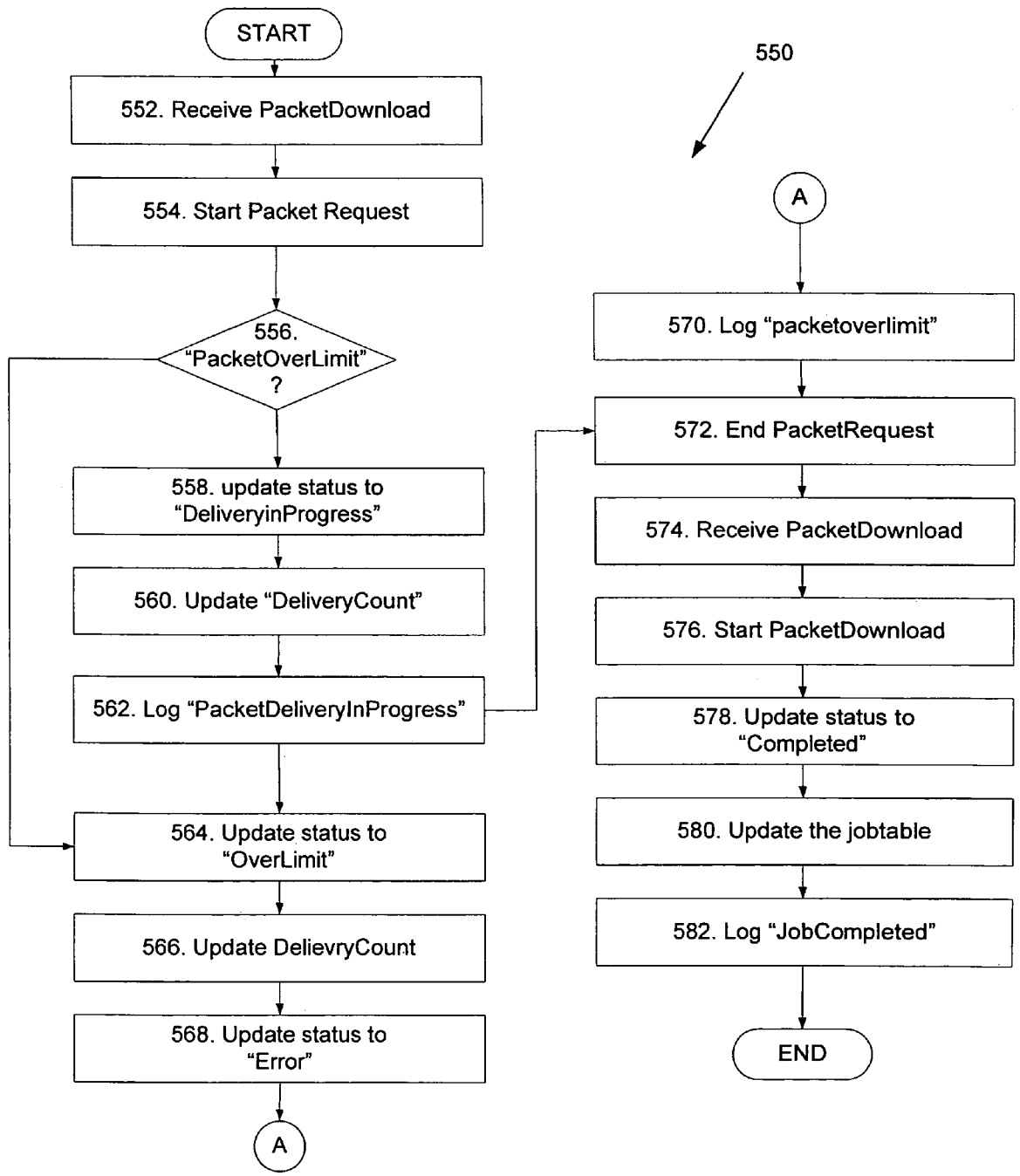
FIG. 12 is a flowchart of a packet distribution program used by the software provisioning system of FIG. 3.

FIG. 12 illustrates a flowchart for a packet distribution program 550 that may be used to distribute provisioning packets from the core provisioning service 206 to various computing devices, such as the computing device 202. The packet distribution program 550 may be initiated by the packet/certificate request manager 386, by a customer service representative assisting a user of a computing device, or in other similar manners.

At a block 552 the core provisioning service 206 may receive a packet download message in the message queue of the distribution service module 208. Such a message may be sent, for example, by the packet/certificate request manager 386 of the computing device 202. Upon receiving the packet download message at a block 554 the core provisioning service 206 may start a packet request transaction.

At the beginning of the packet request transaction, at a block 556, the core provisioning service 206 may determine if status in the packet table 318 is "packet over limit," specifying that the computing device sending the packet download message has not acknowledged previous transmissions of packets by the core provisioning service 206, the control is transferred to a block 564.

If it determined that the status in the packet table 318 is not "packet over limit," at a block 558 the core provisioning service 206 may update the status in the packet table 318 to "delivery in progress."

Subsequently, at a block 560 the core provisioning service 206 may update the delivery count in the packet table 318 to the value as specified in the packet download message. For example, if the packet download message has requested two packets from the core provisioning service 206, the delivery count in the packet table 318 is increased by two. At a block 562 the core provisioning service 206 may log a "packet delivery in progress" message in the job log table 326.

The block 564 may receive control due to the lack of acknowledgement from a computing device, therefore, at the block 564, the core provisioning service 206 may update the status in the packet table 318 to "over limit."

At a block 566 the core provisioning service 206 may update the delivery count in the packet table 318 to the value as specified in the packet download message and at a block 568 the CPS updates the status of the job table 316 to "error." Finally, at a block 570 the core provisioning service 206 may log a "packet over limit" message into the job log table 326.

At a block 572 the core provisioning service 206 may end processing of the packet request transaction and wait for an acknowledgement from the computing device requesting a packet. At a block 574, the core provisioning service 206 may receive a packet download completion message into the message queue of the distribution service module 208. The packet download completion message may be sent by the packet/certificate request manager 386 upon successful download of a requested package.

Upon receiving the packet download completion message, at a block 576 the core provisioning service 206 may start a packet download completion transaction. As a part of the packet download completion transaction, at a block 578 the core provisioning service 206 may update the status in the packet table 318 to "completed" and at a block 580, update the status in the job table also to "completed."

Further, at a block 580, the core provisioning service 206 may log a "job completed" message into the job log table 326 and end the packed download complete transaction at a block 582.

Having illustrated the operation of the various components of the software provisioning system 200, the following FIGS. 13-16 illustrate various example scenarios describing user experiences under various conditions.

Scenario 1—Balance Verification During Login

Figure 13:
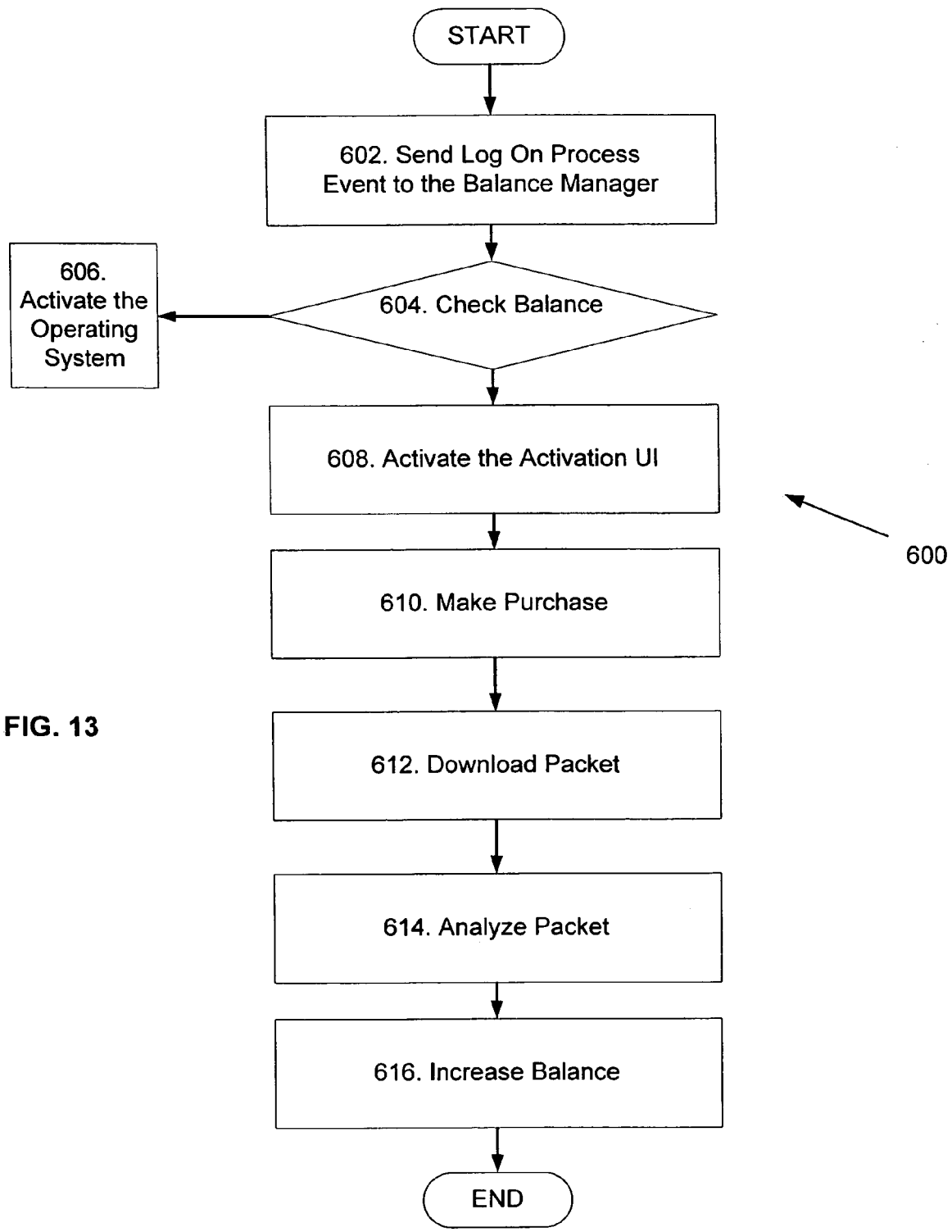
FIG. 13 illustrates a flowchart of an operating scenario for the local provisioning module of FIG. 8.

FIG. 13 illustrates a flowchart 600 depicting a first scenario during the operation of the LPM 224. Specifically, the flowchart 600 depicts a scenario wherein a user is logging on to the computer. As shown in FIG. 13, at a block 602 when a user is trying to log onto the computing device 202 the enforcement add-on module 352 may send a logon event to the balance manager 366. In response to the logon event, at a block 604 the balance manager 366 may verify the balance available to for using the operating system on the computing device 202. If the balance is sufficient, at a block 606, the balance manager 366 may notify the login logic 364 to activate the operating system in a normal manner.

However, if the balance manager 366 determines that the balance is not sufficient, at a block 608, the balance manager 366 may activate the activation UI 396. The purpose of activating the activation UI is to allow the user to make a purchase of additional usage time.

At a block 610, the activation UI 396 may activate the purchase manager 388 and the user may make a purchase. The user may make the purchase by connecting to the billing system 216, by calling a customer service representative, or in any other desired manner. Subsequently, at a block 612, the certificate/packet request manager 386 may download a provisioning packet.

The certificate/packet request manager 386 may provide the downloaded provisioning packet to the secure store manager 358 for secure storage. At a block 614, the balance manager 366 may analyze the downloaded provisioning packet and at a block 616 the provisioning balance available to the computing device 202 may be increased accordingly.

Scenario 2—Usage Purchase After Log On

Figure 14:
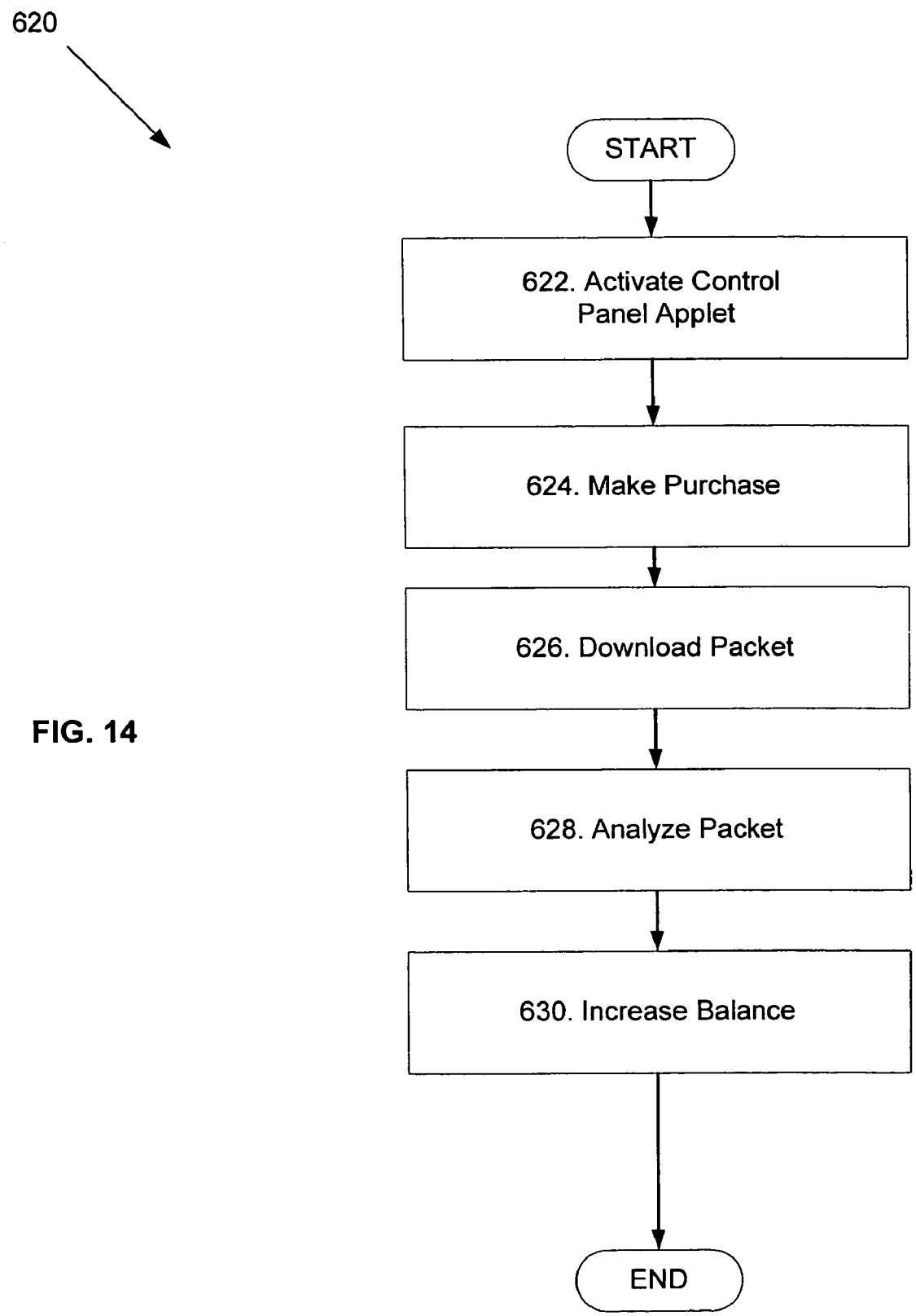
FIG. 14 illustrates another flowchart of an operating scenario for the local provisioning module of FIG. 8.

FIG. 14 illustrates a flowchart 620 depicting a second scenario during the operation of the LPM 224. Specifically, the flowchart 620 depicts a scenario wherein the user is already logged onto the computing device 202 and the user selects a control panel applet or a task bar icon to activate the balance manger 366.

At a block 622 the user may activate the control panel applet that sends an event to the balance manger 366. The balance manager 366 may display the current balance information to the user and invoke the activation UI 396, thereby activating the purchase manager 388. Once the user makes a purchase of additional time, the certificate/packet request manager 386 may download a provisioning packet.

The certificate/packet request manager 386 may provide the downloaded provisioning packet to the secure store manger 358 for secure storage. At a block 628, the balance manager 366 may analyze the downloaded provisioning packet and at a block 630 the provisioning balance available to the computing device 202 may be increased accordingly.

Scenario 3—Balance Update and Notification After Logon

Figure 15:
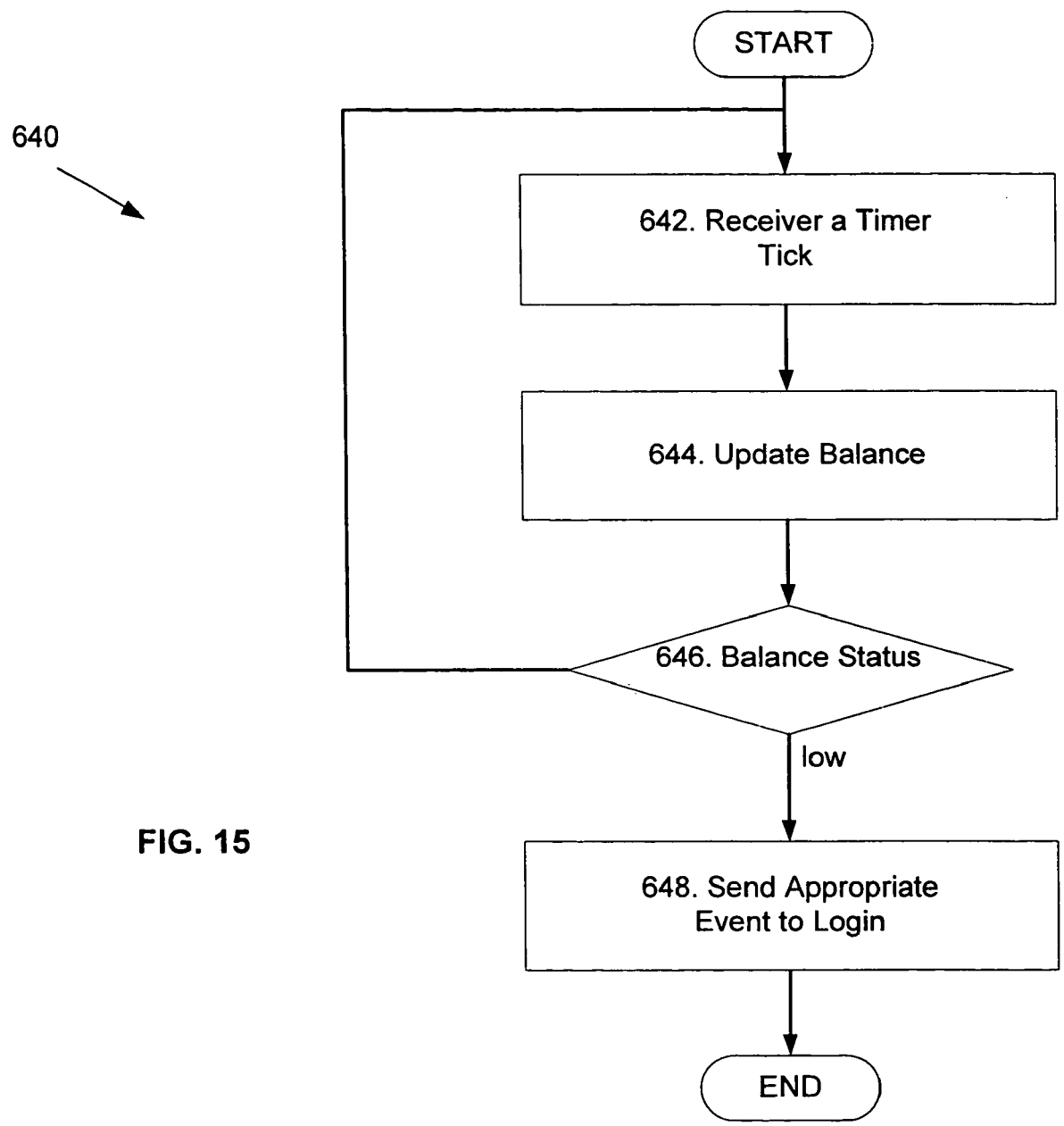
FIG. 15 illustrates another flowchart of an operating scenario for the local provisioning module of FIG. 8.

FIG. 15 illustrates a flowchart 640 depicting a third scenario during the operation of the LPM 224. Specifically, the flowchart 640 depicts a scenario wherein the user is already logged onto the computing device 202 and the login logic 364 receives an event as a result of the time tick from the reliable clock manager 370.

At a block 642, the login logic 364 may receive a time tick event from the reliable clock manager 370. As a result, the login logic 364 may send a time tick event to the balance manager 366.

In response to the time tick event, at a block 644, the balance manager 366 may update the available balance for usage of the operating system on the computing device 202. Subsequently, at a block 646, the balance manger 366 checks the available balance. Based on the result of the valuation, at a block 648, the balance manager 366 may take an appropriate action, which may be, for example, to activate the activation UI 396, to log off the user, to continue other appropriate action.

Scenario 4—Computing Device De-Activation

Figure 16:
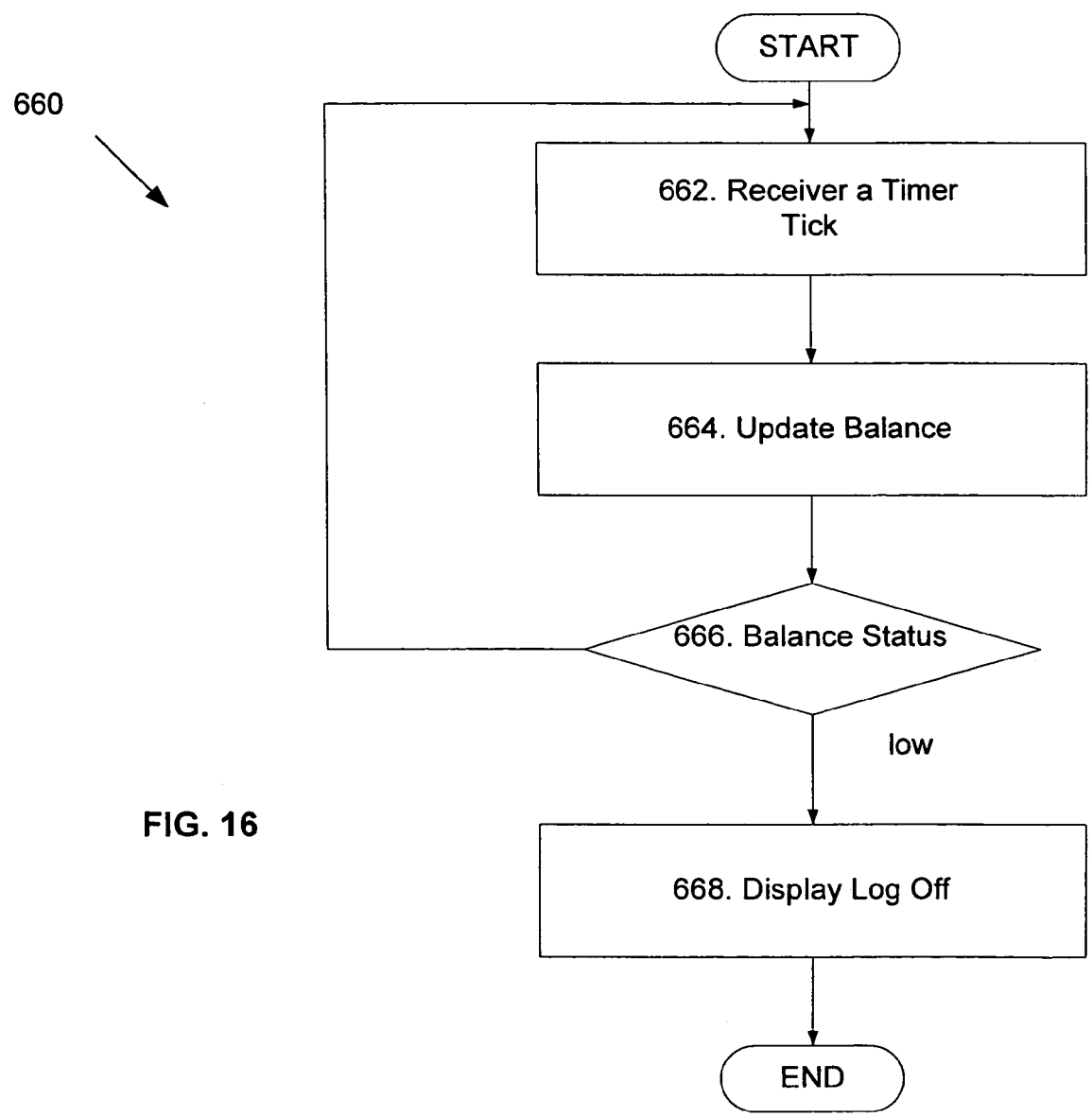
FIG. 16 illustrates another flowchart of an operating scenario for the local provisioning module of FIG. 8.

FIG. 16 illustrates a flowchart 660 depicting a fourth scenario during the operation of the LPM 224. Specifically, the flowchart 660 depicts a scenario wherein the user is already logged onto the computing device 202 and the login logic 364 receives an event as a result of the time tick from the reliable clock manager 370.

At a block 662, the login logic 364 may receive a time tick event from the reliable clock manager 370. As a result, the login logic 364 may send a time tick event to the balance manager 366.

In response to the time tick event, at a block 664, the balance manager 366 may update the available balance for usage of the operating system on the computing device 202. Subsequently, at a block 666, the balance manger 366 may check the available balance. Based on the result of the valuation, at a block 648, the balance manager 366 may take an appropriate action, which may be, for example, to activate the activation UI 396, to log off the user, to continue other appropriate action.

In the present case, for example, the balance manager 366 finds that the balance available to the computing device 202 is at or below a threshold, such as zero. As a result at a block 668, the balance manger 366 may cause the notification UI 398 to display a log off message and eventually logs off the user from using the operating system on the computing device 202. In an alternate case, the notification UI 398 may also activate the purchase manager 388 to allow the user to purchase additional usage time.

Scenario 5—Pre-Paid Input After Log On

Figure 17:
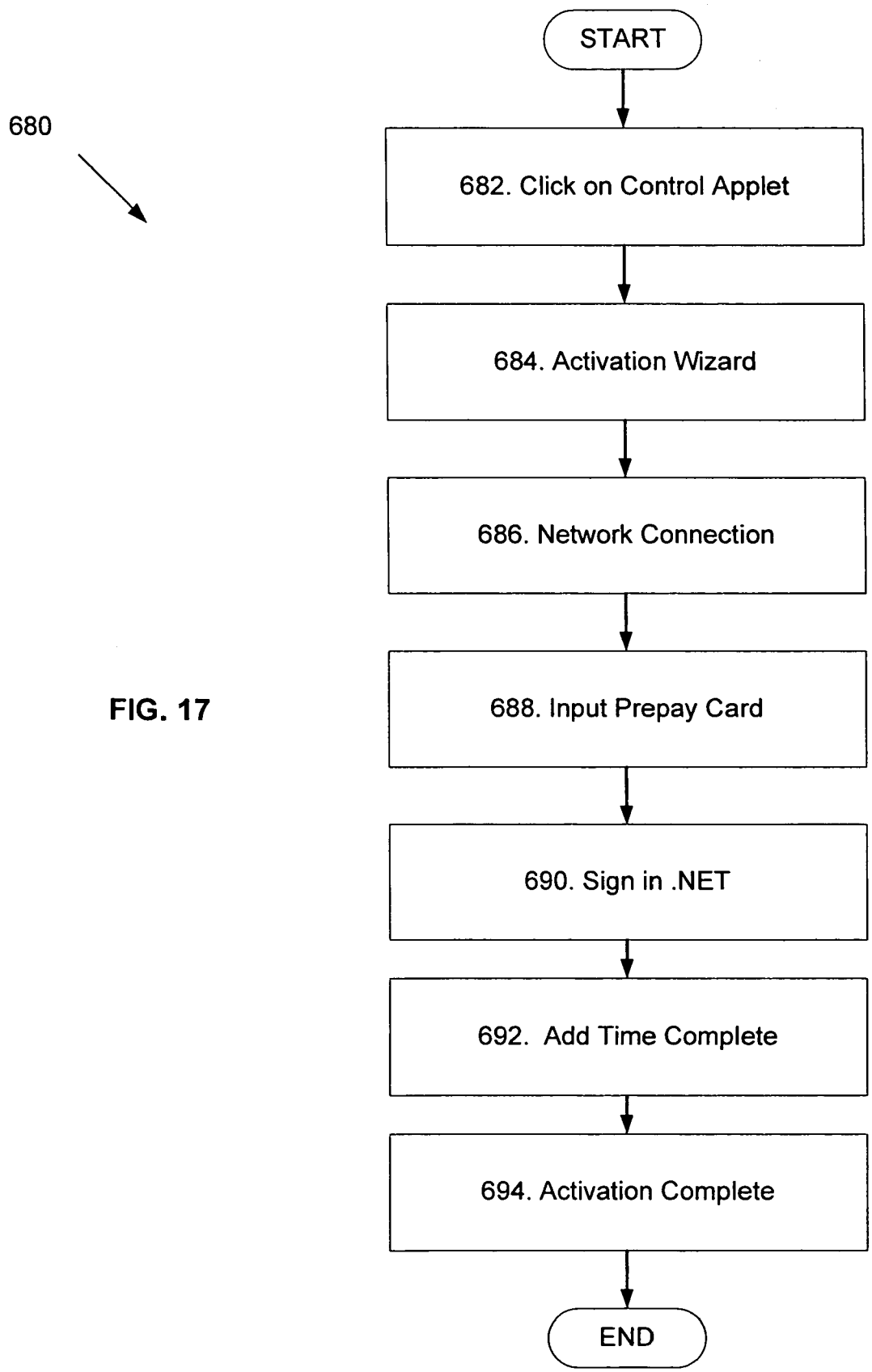
FIG. 17 illustrates yet another flowchart of an operating scenario for the local provisioning module of FIG. 8.

FIG. 17 illustrates a flowchart 680 depicting a fifth scenario during the operation of the LPM 224. Specifically, the flowchart 680 depicts a scenario wherein the user is already logged onto the computing device 202 and the user selects a control panel applet or a task bar icon to activate an activation wizard to input information from a pre-paid card. This may be the case when a user has previously purchased a pre-paid card and decides to add the usage time that can be obtained by the pre-paid card to his or her account.

Figure 18:
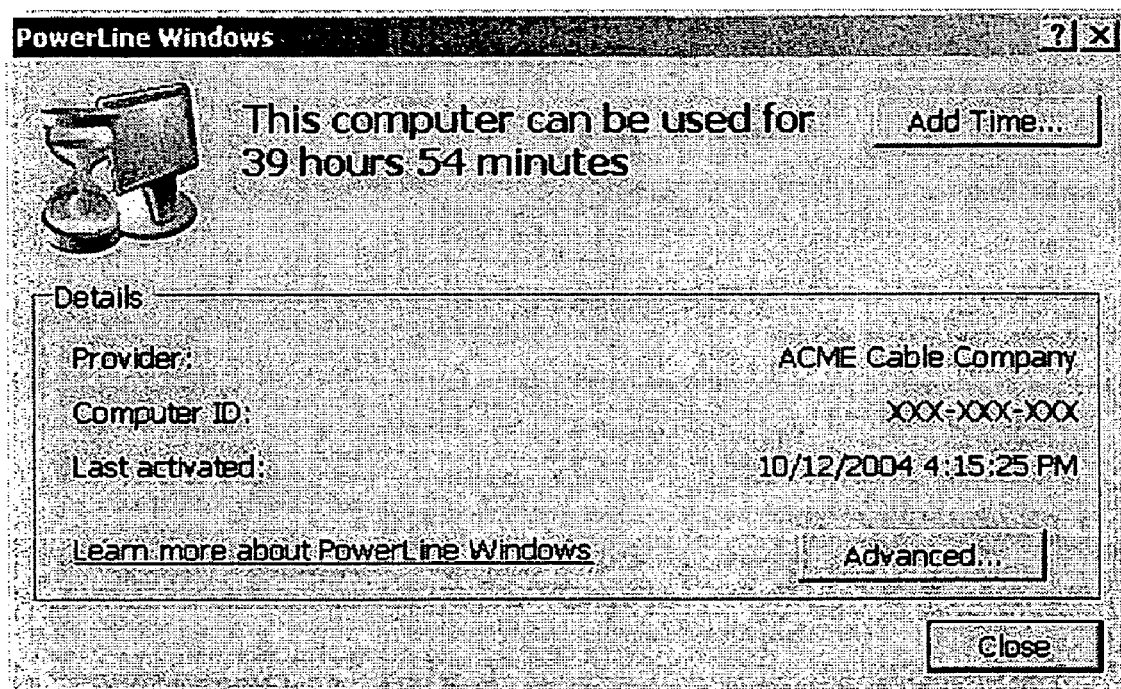
FIG. 18 illustrates an exemplary GUI presented to the user during the operating scenario of FIG. 17.

At a block 682 the user may activate the control panel applet that sends an event to the activation UI 396 to show an activation wizard. An example of a GUI window that may be displayed to a user is illustrated by an add time window 684 in FIG. 18. The user may select the add time button from the add time window 684 to input information from the pre-paid card.

Figure 19:
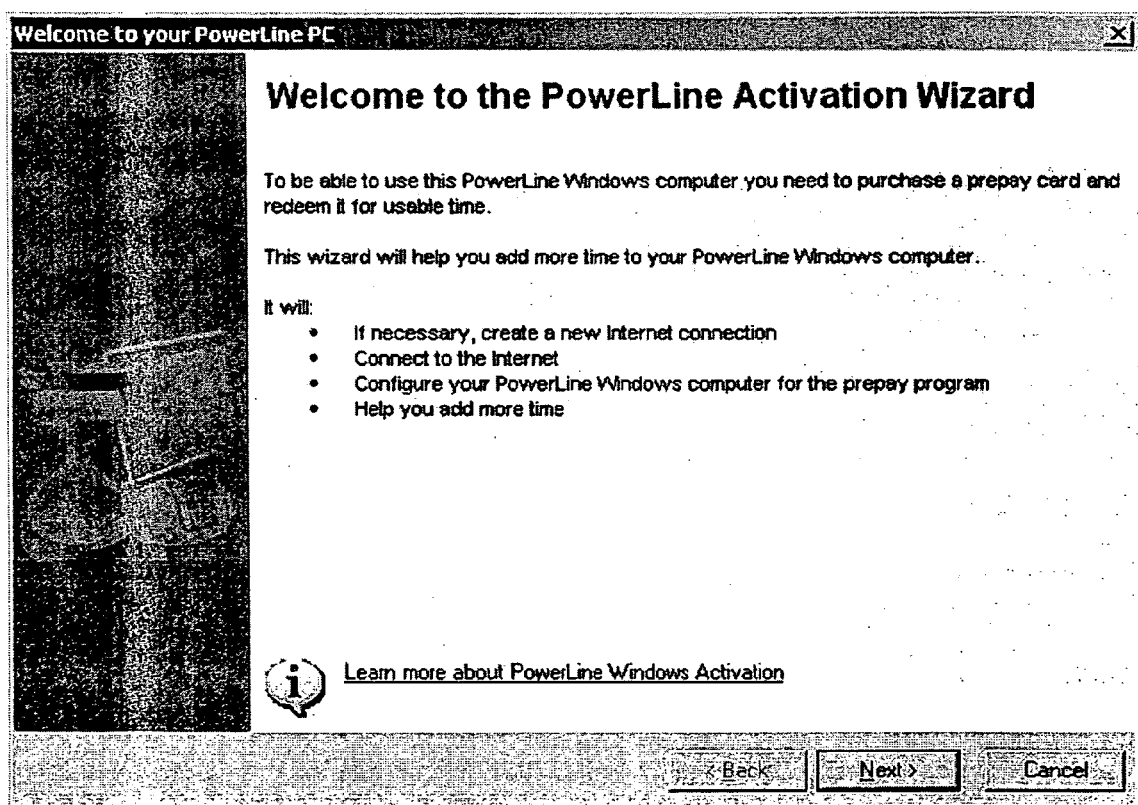
FIG. 19 illustrates another exemplary GUI presented to the user during the operating scenario of FIG. 17.

Subsequently, at a block 686, the activation UI 396 may notify the user of various information that the user may need to be able to use the activation wizard, which is illustrated by the GUI 688 in FIG. 19.

Figure 20:
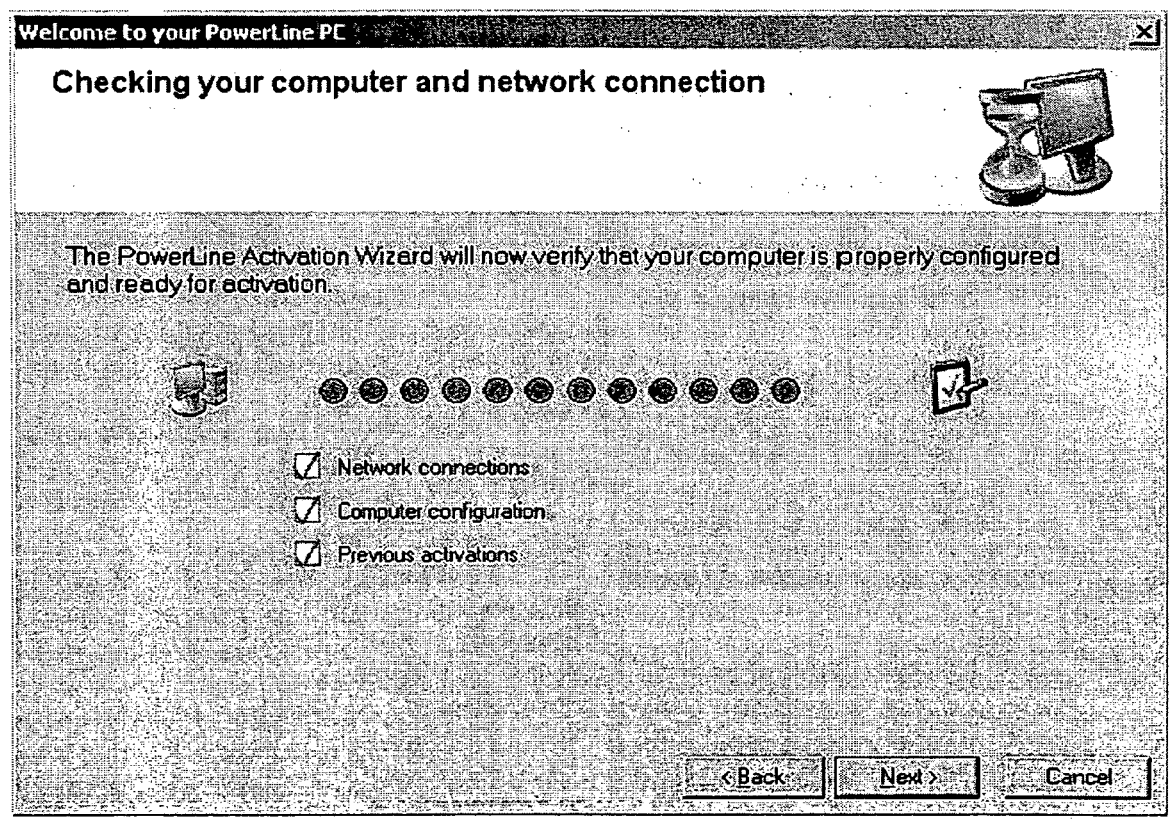
FIG. 20 illustrates another exemplary GUI presented to the user during the operating scenario of FIG. 17.

At a block 690, the activation UI 396 may present a network connection GUI 692 as shown in FIG. 20, which notifies the user that the web service communication manager 390 is connecting to the Internet to access the core provisioning service 206.

Figure 21:
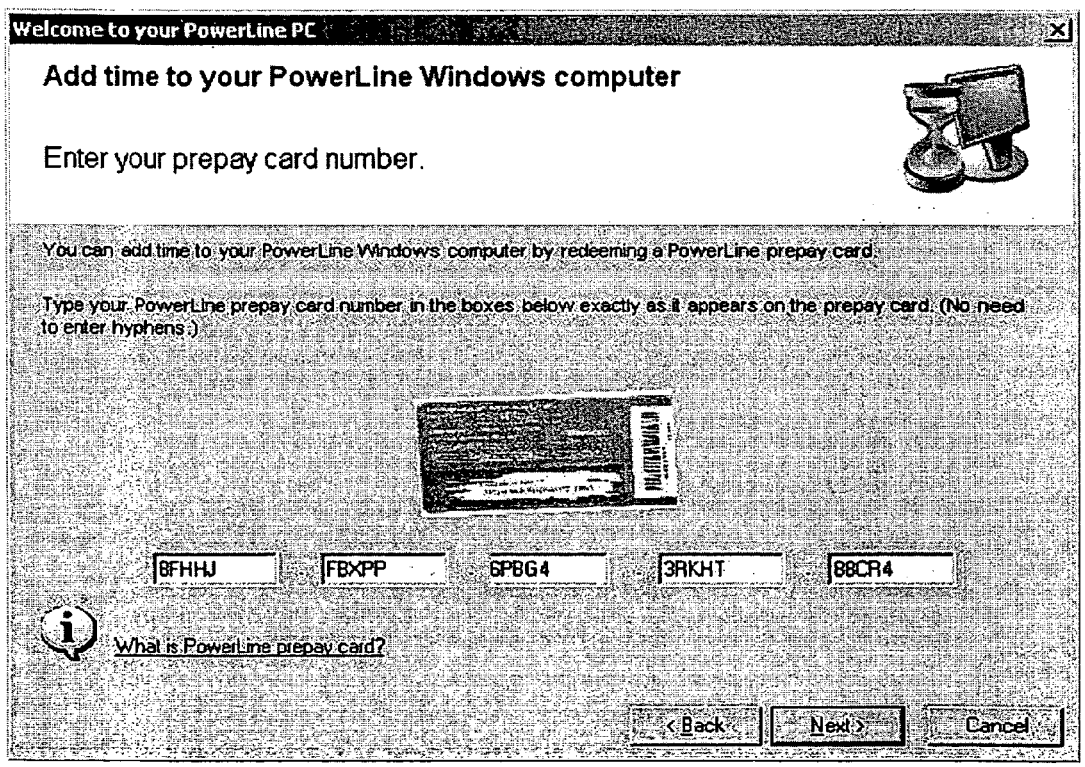
FIG. 21 illustrates another exemplary GUI presented to the user during the operating scenario of FIG. 17.

Subsequently, at a block 694 the activation UI 396 may invite the user to input the key received from the pre-paid usage card. The key on the pre-paid card may comprise a string of alpha-numeric or other characters. In the present case the key is a 25 character long alpha-numeric key, as shown to be input into a GUI 696 of FIG. 21.

Figure 22:
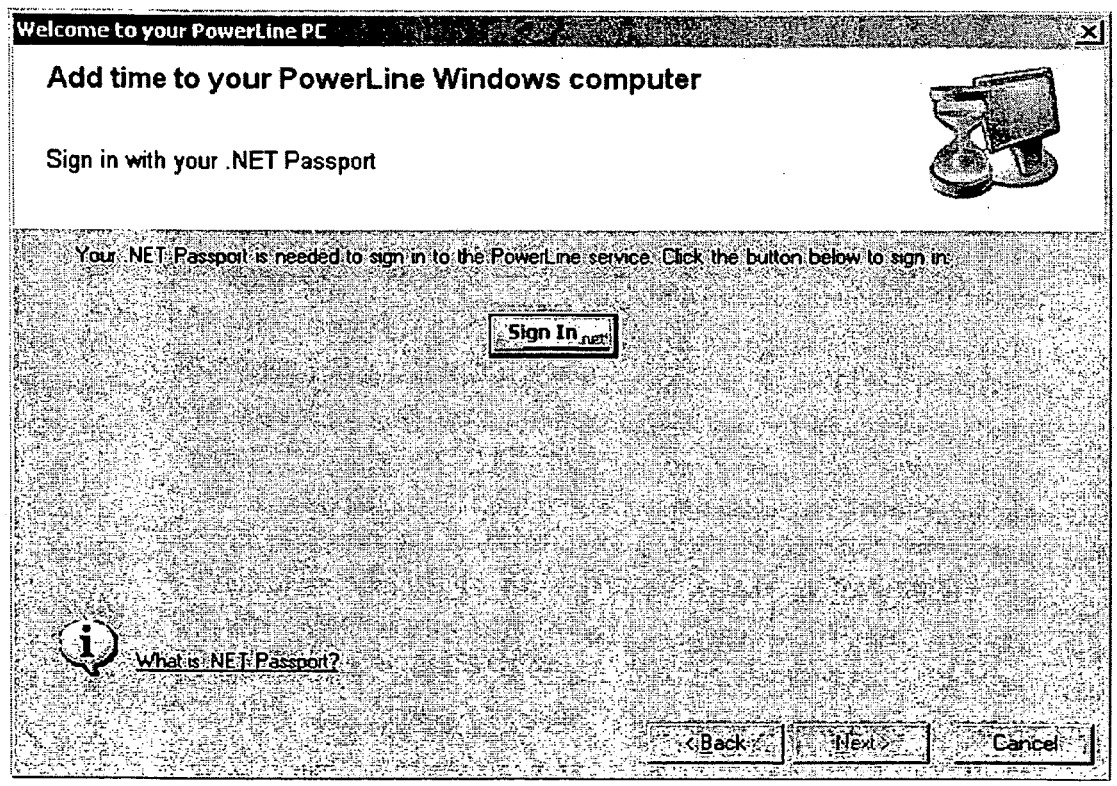
FIG. 22 illustrates another exemplary GUI presented to the user during the operating scenario of FIG. 17.

Upon receiving the key from the pre-paid card, at a block 698, the activation UI 396 may invite the user to log into the .NET® system, as shown by a GUI 700 of FIG. 22. Note that it may not always be necessary that the user logs into the .NET® system.

Figure 23:
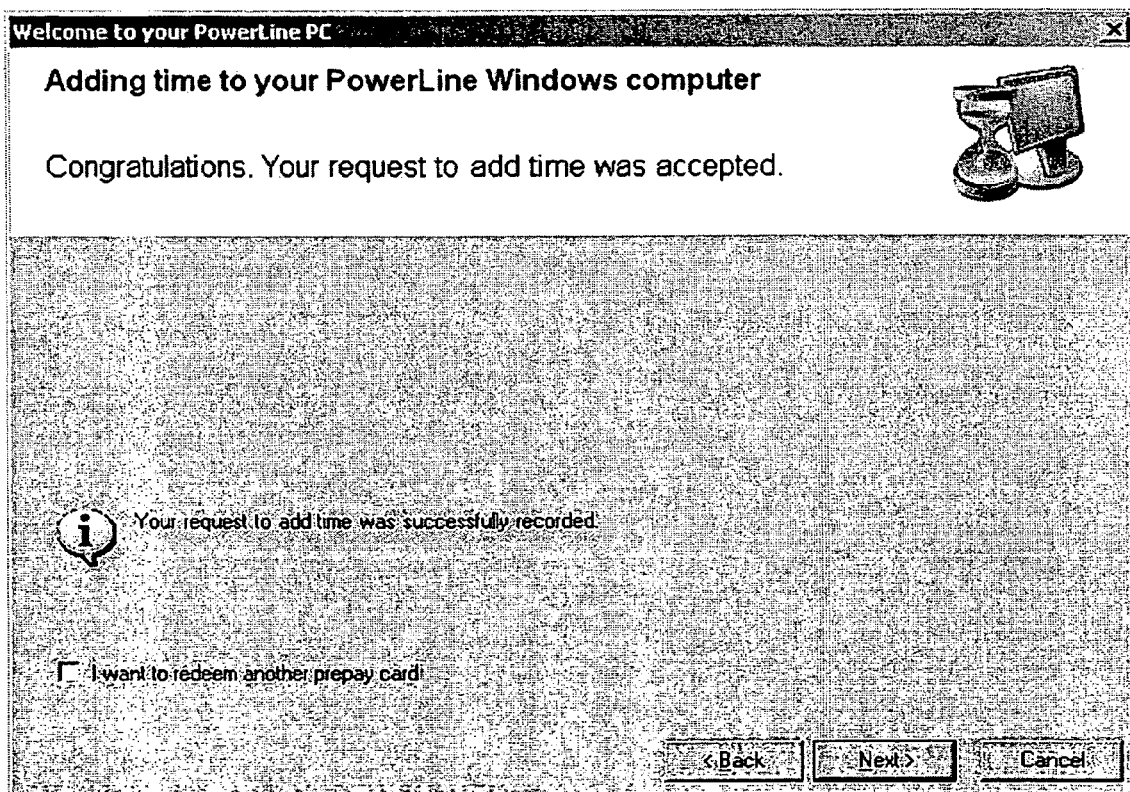
FIG. 23 illustrates another exemplary GUI presented to the user during the operating scenario of FIG. 17.

Subsequently, at a block 702, the activation UI 396 may receive a confirmation from the core provisioning service 206 that the user's key from the pre-paid card has been accepted and that the users account should be increased by the corresponding amount of time. The message notifying the successful addition of time is illustrated by a GUI 704 of FIG. 23.

Figure 24:
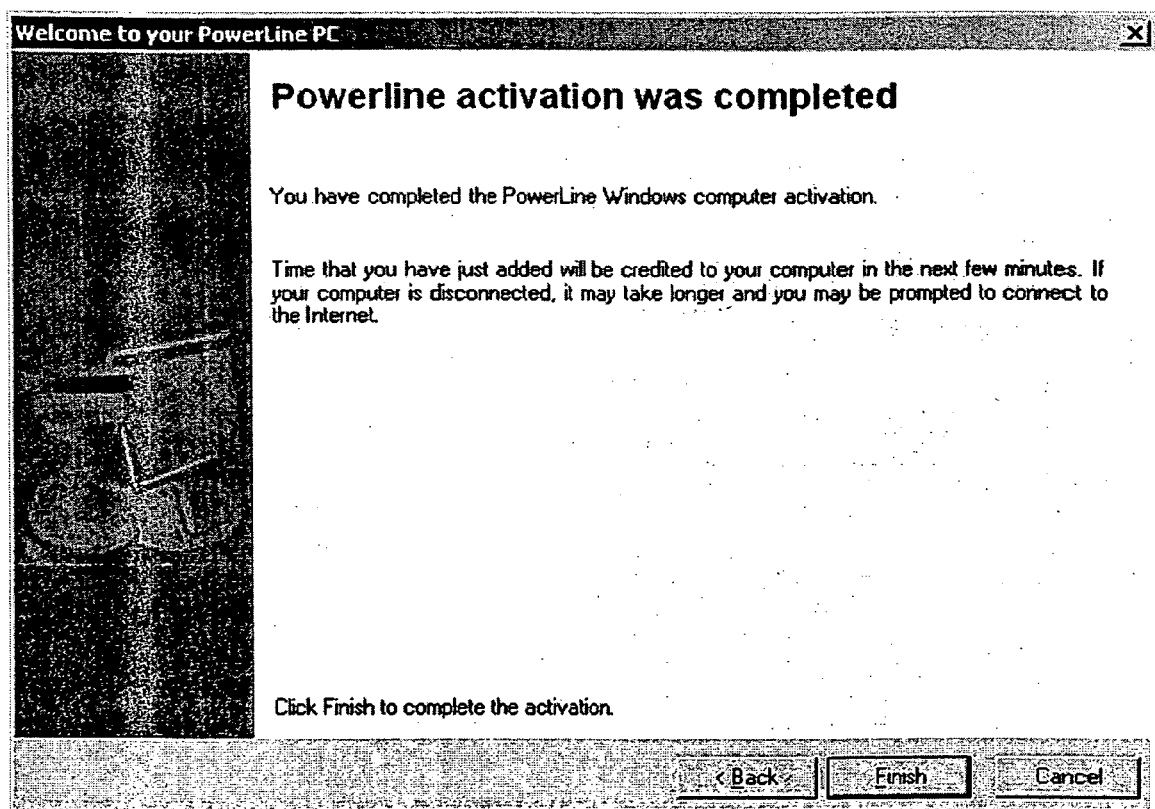
FIG. 24 illustrates another exemplary GUI presented to the user during the operating scenario of FIG. 17.

Finally, at a block 706, the activation UI 396 may notify the user that the time that the user had just added by using the pre-paid card will be credited to the computing device 202 in a few minutes, as illustrated by the GUI 708 of FIG. 24.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A dynamic software provisioning system for provisioning software on a computing device that is communicatively coupled to a communications network, the dynamic software provisioning system comprising:

a computing device that is communicatively coupled to first and second computers by means of a communications network, the computing device containing software stored in memory;

a billing system implemented on the first computer, the first computer having a first computer-readable storage medium with first computer-executable instructions that, when executed, sell an amount of usage of the software stored in memory on the computing device;

a provisioning system implemented on the second computer, the second computer having a second computer-readable storage medium with second computer-executable instructions that, when executed, dynamically provision increments of usage of the software on the computing device, the provisioning system including:

a registration module that, when a registration request is received from the billing system, registers the computing device, the registration request including a hardware identification that contains information specific to components of the computing device, a certificate module that, when executed, generates a provisioned device certificate, a distribution and packet generation module that, when a packet generation request is received, generates a provisioning packet, the packet generation request including a provisioned device initialization key, and the distribution module, when executed, also transmitting the provisioning packet to the computing device over the communications network; and wherein the computing device includes:

a packet request module that, when executed, sends the packet generation request to the provisioning system and downloads the provisioning packet, a storage module that, when executed, stores the provisioning packet, a reliable clock manager that, when executed, generates time tick events corresponding to use of the software on the computing device, login logic that, when executed, (i) qualifies login credentials to allow a user to operate the computing device, (ii) receives the time tick event, and (iii) forwards the time tick for processing;

a balance module that receives the time tick event from the login logic and updates an available balance corresponding to available use of the software on the computing device; and an enforcement module that: (1) activates the software on the computing device if the balance value is above a threshold; and (2) de-activates the software on the computing device and de-activates the computing device for all purposes other than obtaining additional provisioning packets if the available balance is lowered below the threshold by the time tick event or if there is no available balance at login of the computing device.

2. The dynamic software provisioning system of claim 1, wherein the provisioning system, requests a private key for the computing device and encodes the certificate with the private key.

3. The dynamic software provisioning system of claim 1, wherein the billing system generates a pre-paid card printed with the initialization key and sells the prepaid card to a user via a retail store.

4. The dynamic software provisioning system of claim 1, wherein the computing device further includes:

an activation module that receives the initialization key from the user; and the request module generates the packet generation request with the initialization key.

5. The plurality of computing devices of claim 1, wherein the computing device is a personal computer.

6. The plurality of computing devices of claim 1, wherein the provisioning packet is an XML based provisioning packet.

7. The dynamic software provisioning system of claim 1, wherein the computing device communicates with the billing system and the provisioning system using the Internet.

8. The plurality of computing devices of claim 1, wherein the software is an operating system.

9. A dynamic software provisioning system for provisioning software on a computing device that is communicatively coupled to a communications network, the dynamic software provisioning system comprising:

a computing device that is communicatively coupled to first and second computers by means of a communications network, the computing device containing software stored in memory;

a billing system implemented on the first computer, the first computer having a first computer-readable storage medium with first computer-executable instructions that, when executed, sell an amount of usage of the software stored in memory on the computing device;

a provisioning system implemented on the second computer, the second computer having a second computer-readable storage medium with second computer-executable instructions that, when executed, dynamically provision increments of usage of the software on the computing device, the provisioning system including:

a registration module that, when a registration request is received from the billing system, registers the computing device, the registration request including a hardware identification that contains information specific to components of the computing device, a certificate module that, when executed, generates a provisioned device certificate, a distribution and packet generation module that, when a packet generation request is received, generates a provisioning packet, the packet generation request including a provisioned device initialization key, and the distribution module, when executed, also transmitting the provisioning packet to the computing device over the communications network; and wherein the computing device includes:

a packet request module that, when executed, sends the packet generation request to the provisioning system and downloads the provisioning packet, a storage module that, when executed, stores the provisioning packet, a reliable clock manager that, when executed, generates time tick events corresponding to use of the software on the computing device, login logic that, when executed, (i) qualifies login credentials to allow a user to operate the computing device, (ii) receives the time tick event, and (iii) forwards the time tick for processing;

a balance module that receives the time tick event from the login logic and updates an available balance corresponding to available use of the software on the computing device;

an enforcement module that: (1) activates the software on the computing device if the balance value is above a threshold; and (2) de-activates the software on the computing device and de-activates the computing device for all purposes other than obtaining additional provisioning packets if the available balance is lowered below the threshold by the time tick event or if there is no available balance at login of the computing device;

wherein the provisioning system requests a private key for the computing device and encodes the certificate with the private key;

wherein the billing system generates a pre-paid card printed with the initialization key and sells the prepaid card to a user via a retail store;

wherein the computing device further includes an activation module that receives the initialization key from the user;

wherein the request module, when executed, generates the packet generation request with the initialization key;

wherein the computing device is a personal computer;

wherein the provisioning packet is an XML based provisioning packet;

wherein the computing device communicates with the billing system and the provisioning system using the Internet; and wherein the software is an operating system.

* * * * *